(12) United States Patent
Patterson et al.

(10) Patent No.: US 6,517,708 B1
(45) Date of Patent: *Feb. 11, 2003

(54) APPARATUS FOR SEPARATING OXIDES OF HEAVY ISOTOPES OF HYDROGEN FROM WATER

(76) Inventors: James A. Patterson, 2612 Tanglewood Dr., Sarasota, FL (US) 34239; Louis E. Furlong, 5770 Midnight Pass Rd., #603C, Sarasota, FL (US) 34242; Martin J. Gruber, Grünewald Weg 22, D73230, Kirchheim UT (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/691,081

(22) Filed: Oct. 18, 2000

Related U.S. Application Data

(60) Division of application No. 09/275,335, filed on Mar. 24, 1999, now Pat. No. 6,348,153, which is a continuation-in-part of application No. 09/093,459, filed on Jun. 8, 1998, now Pat. No. 6,110,373, which is a continuation-in-part of application No. 09/047,648, filed on Mar. 25, 1998, now abandoned.

(51) Int. Cl.$^7$ ................................................ B01D 59/50
(52) U.S. Cl. ...................... 210/96.2; 210/143; 210/180; 210/182; 210/189; 210/263; 210/266; 210/268; 210/269; 210/284
(58) Field of Search .......................... 210/96.1, 96.2, 210/143, 175, 256, 259, 260, 263, 266, 269, 284, 180, 181, 182, 189, 268

(56) References Cited

U.S. PATENT DOCUMENTS

| | | | |
|---|---|---|---|
| 3,771,234 A | 11/1973 | Forster et al. | 34/1 |
| 3,977,089 A | 8/1976 | Forster et al. | 34/1 |
| 4,010,108 A | 3/1977 | Gablin et al. | 588/6 |
| 4,023,279 A | 5/1977 | Janda | 34/1 |
| 4,055,001 A | 10/1977 | Forster et al. | 34/1 |
| 4,085,061 A | 4/1978 | O'Brien | 252/301.1 W |
| 4,126,667 A | 11/1978 | Butler et al. | 423/580 |
| 4,138,329 A | 2/1979 | Kita | 210/682 |
| 4,143,123 A | 3/1979 | Butler et al. | 423/580.2 |
| 4,190,515 A | 2/1980 | Butler et al. | 204/266 |
| 4,205,459 A | 6/1980 | Koseki et al. | 34/166 |
| 4,222,176 A | 9/1980 | Tjurin et al. | 34/1 |

(List continued on next page.)

*Primary Examiner*—Ivars Cintins
(74) *Attorney, Agent, or Firm*—Charles J. Prescott

(57) ABSTRACT

A process and apparatus for treating the heavy hydrogen isotope content of the contaminated water by contacting the contaminated water with a molecular separation material including a support medium carrying a plurality of hydration sites having associated waters of hydration, whereby a portion of the waters of hydration are replaced with heavy hydrogen isotope water molecules from the contaminated water. The hydrogen isotope water molecule content of the contaminated water is thus decreased. The molecular separation material is preferably a polymer, such as a polystyrene/divinyl benzene cross-linked polymer, having hydration sites with associated waters of hydration. Preferred hydration sites are obtained by reacting the polymer, which has been sulfonated or phosphonated to create reactive sites, with a salt of, for example, aluminum, sodium, magnesium, copper, zinc, cobalt, iron, nickel, manganese, potassium and chromium. Before or during contact with the molecular separation material, the contaminated water may be brought into contact with a separation membrane selectively permeable to light water molecules relative to hydrogen isotope water molecules, to remove light water molecules from the water, thereby increasing the concentration of said hydrogen isotope molecules.

19 Claims, 26 Drawing Sheets

U.S. PATENT DOCUMENTS

| | | | |
|---|---|---|---|
| 4,269,716 A | 5/1981 | Gurian | 210/675 |
| 4,274,962 A | 6/1981 | Queiser et al. | 210/257.1 |
| 4,322,394 A | 3/1982 | Mezey et al. | 423/244.11 |
| 4,330,946 A | 5/1982 | Corneya | 34/1 |
| 4,363,757 A | 12/1982 | Koster et al. | 588/3 |
| 4,424,903 A | 1/1984 | Knieper et al. | 206/525 |
| 4,519,996 A | 5/1985 | Knochel et al. | 423/249 |
| 4,564,515 A | 1/1986 | Mandrin | 423/648 A |
| 4,567,340 A | 1/1986 | Latchum | 219/701 |
| 4,601,114 A | 7/1986 | Noguchi | 34/27 |
| 4,687,644 A | 8/1987 | Iniotakis et al. | 422/159 |
| 4,805,317 A | 2/1989 | Inglis et al. | 34/1 |
| 4,861,490 A | 8/1989 | Morris | 210/669 |
| 5,006,258 A | 4/1991 | Veatch et al. | 210/677 |
| 5,108,616 A | 4/1992 | Kunz | 210/678 |
| 5,176,885 A | 1/1993 | Impink et al. | 423/6 |
| 5,191,721 A | 3/1993 | Incorvia et al. | 34/1 |
| 5,192,445 A | 3/1993 | Salem et al. | 210/685 |
| 5,248,435 A | 9/1993 | Morita et al. | 210/681 |
| 5,354,476 A | 10/1994 | Kubo et al. | 210/679 |
| 5,377,234 A | 12/1994 | Robles et al. | 376/245 |
| 5,411,712 A | 5/1995 | Woodmansee et al. | 422/186 |
| 5,429,665 A | 7/1995 | Botich | 95/99 |
| 5,451,322 A | 9/1995 | Nelson et al. | 210/653 |
| 5,464,530 A | 11/1995 | Stivers | 210/141 |
| 5,581,903 A | 12/1996 | Botich | 34/264 |
| 5,595,666 A | 1/1997 | Kochen et al. | 210/679 |
| 5,702,608 A | 12/1997 | Foos et al. | 210/668 |
| 5,732,562 A | 3/1998 | Moratalla | 62/94 |
| 5,736,052 A | 4/1998 | Concklin | 210/675 |
| 5,954,968 A * | 9/1999 | Patterson | 210/651 |
| 6,110,373 A * | 8/2000 | Patterson et al. | 210/638 |
| 6,153,092 A * | 11/2000 | Patterson et al. | 210/266 |

* cited by examiner (PERMEATION)

Figure 4(A) Dry Resin
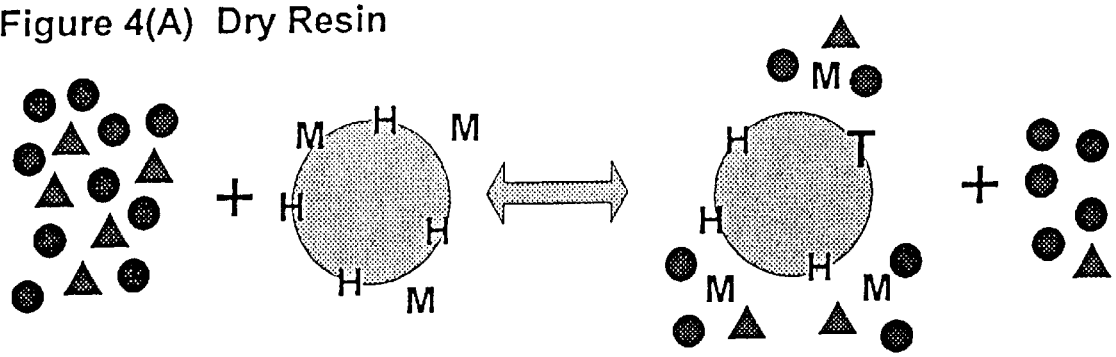
Figure 4(B) Pre-wetted Resin
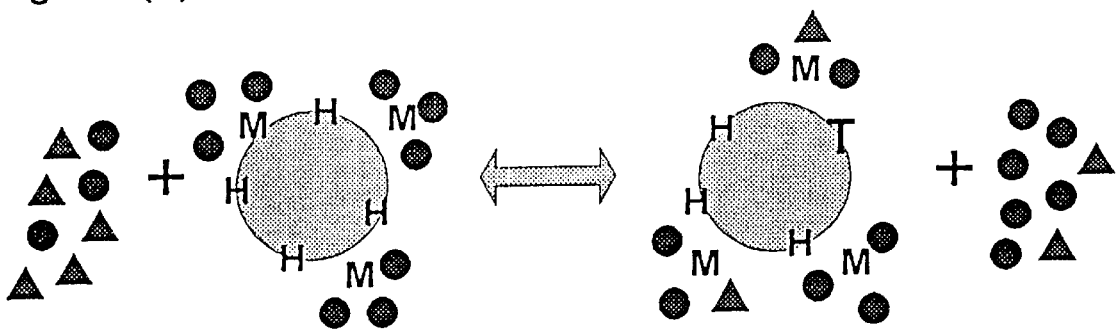
Figure 4(C) Partially Saturated Resin
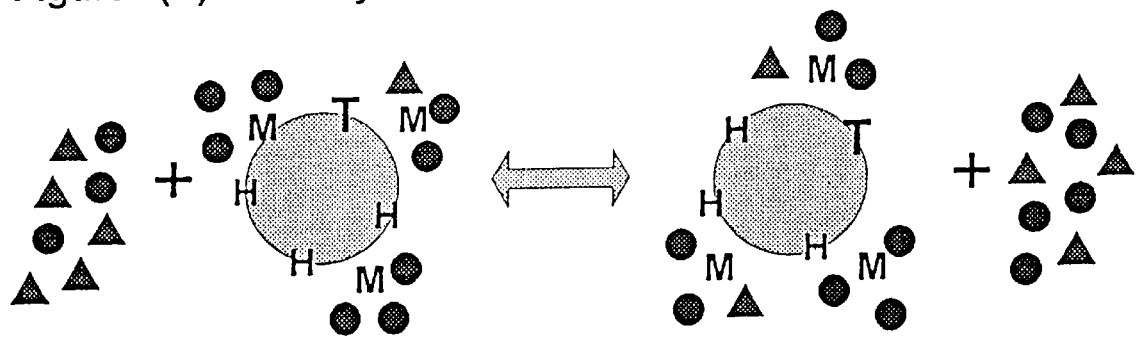
▲ HTO   M: Metal Site
● HOH   H: Hydrogen atom
○ Resin T: Tritium atom TRS Process Flow - In-Place Regeneration TRS Process Flow - External Regeneration TRS Process Flow - Large Scale Unit

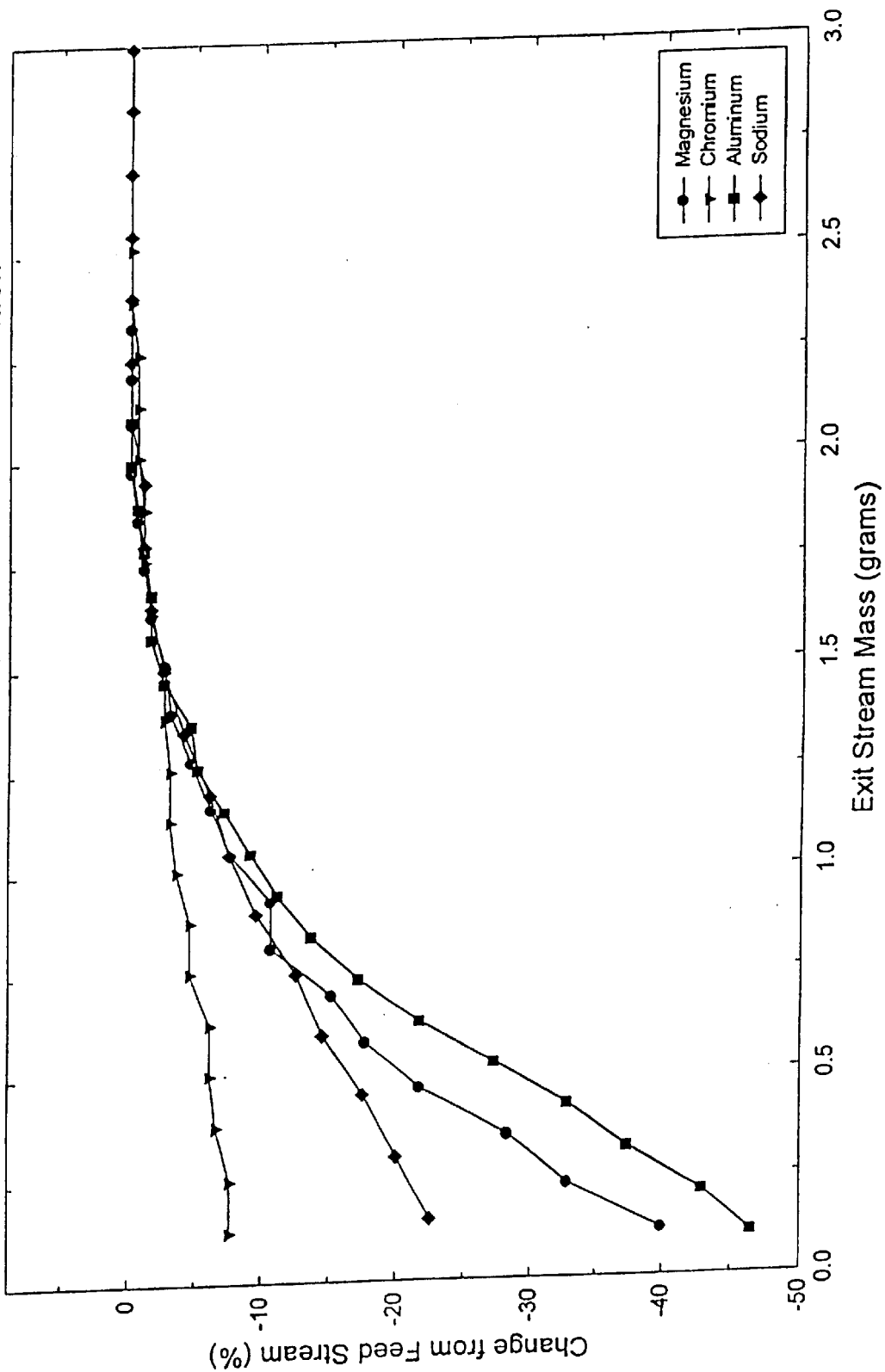

D2O Equilibrium Reductions for Various Types of Resins
Aluminum Loaded Resin - Dry : 5% D2O Feed Concentration Tritium Adsorption Curves using 2 meter Teflon Column Aluminum Loaded Resin : ~125 µCi/L Feed Concentration Tritium Regeneration using Fluidized Bed Dryer
PS-DVB Resin, Sodium and Aluminum loaded
Degree of Regeneration achieved - Desorption Method

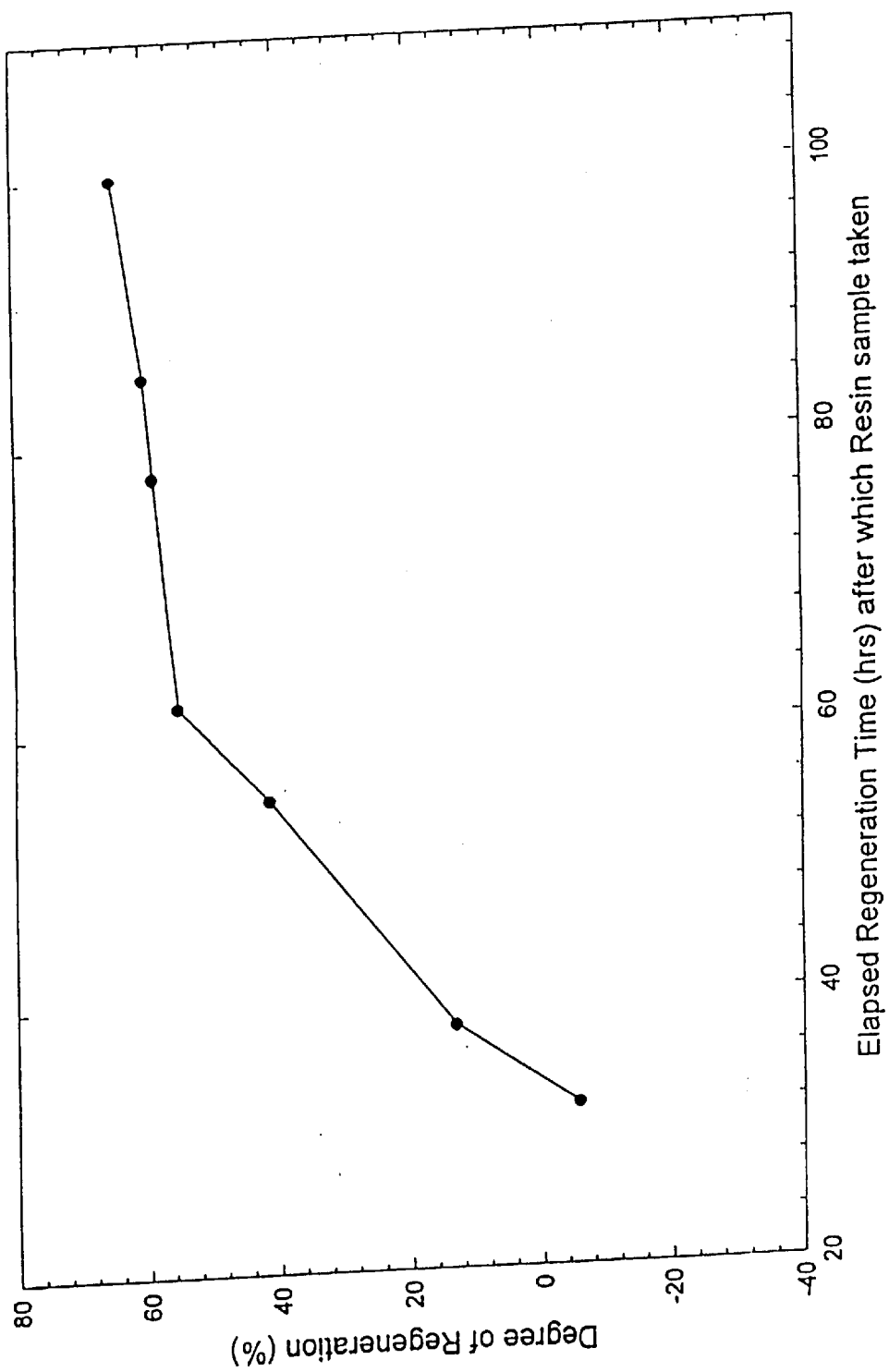

APPARATUS FOR SEPARATING OXIDES OF HEAVY ISOTOPES OF HYDROGEN FROM WATER

This is a divisional application of U.S. patent application Ser. No. 09/275,335, filed Mar. 24, 1999, now U.S. Pat. No. 6,348,153, which is a continuation-in-part of U.S. patent application Ser. No. 09/093,459 filed Jun. 8, 1998, now U.S. Pat. No. 6,110,373, which is a continuation-in-part of U.S. patent application Ser. No. 09/047,648 filed Mar. 25, 1998, now abandoned. These invention were commonly owned at the time of invention.

BACKGROUND OF THE INVENTION

1. Field of the Invention

The present invention relates to the separation of oxides of heavy isotopes of hydrogen, and in particular to a process and apparatus for separating deuterium oxide (HDO, $D_2O$), tritium oxide (HTO, $T_2O$) and oxides of deuterium and tritium (DTO) from light water ($H_2O$) contaminated with heavy isotopes of water. In addition, this process addresses separation of heavy water isotopes, e.g. DTO from $D_2O$, and HTO from $D_2O$. Separation is effected by passing the contaminated water through a molecular separation material containing hydration sites, i.e., sites with associated waters of hydration. The heavy isotopic water is held at higher concentrations within the waters of hydration than in the contaminated water thus providing a separation effect. Heavy isotopic water can also replace adsorbed light water. Separation of the isotope molecules may also be effected with a separation membrane that selectively allows passage of light water molecules in preference to the other heavy isotope molecules. These two procedures may also be combined.

2. Description of the Prior Art

Nuclear power plants must routinely deal with the replacement and disposal of contaminated water taken from the core reactor that is laden with heavy isotopes of hydrogen, namely deuterium oxides, tritium oxides and deuterium-tritium oxides. Tritium in particular is highly radioactive having a half-life of about twelve and one half years emitting beta rays to form helium.

Periodically, the contaminated water from nuclear reactors must be replaced. It has become industry practice of dispose of the old contaminated water by simply dispersing it over adjacent ground areas or evaporating the contaminated water into the atmosphere. This is stressful to the environment as the deuterium oxides and tritium oxides are now known to have contaminated ground water sources. One alternative is to sequester contaminated water in concrete at a considerable expense.

SUMMARY OF THE INVENTION

In accordance with the present invention, a process and related apparatus are described for separating deuterium oxide (HDO, $D_2O$ ) and tritium oxide (HTO, $T_2O$), i.e. heavy water and tritiated water, and deuterium-tritium oxides, from waste water. As used herein, water molecules of the formula $H_2O$ will be referred to as light water molecules, or simply water molecules, while water molecules in which one or both of the hydrogen atoms have been replaced by one of these hydrogen isotopes will be referred to as isotope water molecules or isotope molecules.

In the described process, a portion of the isotope water molecules are removed from contaminated water, i.e., water containing a small amount of isotope water molecules, through selective adsorption by contacting the contaminated water with a molecular separation material containing hydration sites carrying one or more associated waters of hydration. In the process, isotope water molecules present in the contaminated water selectively replace a portion of the waters of hydration associated with the hydration sites. The molecular separation material can then be separated from the water, reducing the percentage of isotope molecules in the water. After separation, the molecular separation material can be regenerated by removing the isotope molecules for long-term storage, and reused repeatedly to separate isotope molecules.

In order to improve the efficiency of the selective adsorption process, the percentage of isotope molecules in the contaminated water can be increased, thereby increasing the exposure of isotope molecules to hydration sites, by removing a portion of the light water molecules, before or during the selective adsorption, by bringing the contaminated water into contact with a porous film or membrane that exhibits a greater permeability for light water molecules than for the larger isotope molecules. For some purposes, adequate separation may be effected through membrane separation alone.

The Molecular Separation Material

Generally, the molecular separation material of the present invention is comprised of a support medium having a plurality of hydration sites, i.e., sites with associated waters of hydration. The effectiveness of the molecular separation material is determined by the number of hydration sites exposed to the contaminated water, and to the number of waters of hydration at each site. The support medium used to carry the hydration sites is not critical to the invention so long as exposure of the contaminated water to numerous sites containing multiple waters of hydration is provided. In general, this objective is preferably achievable with a high surface area support medium having a plurality of hydration attachment sites.

The support medium or medium may be, for example, a polymer, such as polystyrene/divinyl benzene (PSDVB), or polyacrylic/divinyl benzene (PADVB). These polymers are commonly used as supports in ion exchange resins in the preparation of ion exchange resins. The polymer may be functionalized for example, by being sulfonated or phosphonated to provide the sites for attachment of metal or other cations with the required associated waters of hydration. Both strong and weak acid resins have been shown to be effective.

It is important to note that the present invention involves the preferential adsorption or substitution of the waters of hydration associated with the hydration sites, and not the replacement of the cation or anion as is normally practiced in using this type of resin. Thus, while the resins employed are referred to in some instances as ion exchange resins, since this is the purpose for which they are commonly employed, their function in the present invention is to facilitate molecular exchange of isotope water molecules with the associated light water molecules attached to the hydration sites.

Also, while the present invention will be exemplified by the use of the above resins, it will also become apparent that other materials having a large surface area and hydration sites can be used. That is, the present invention involves the interaction between the hydration sites and the isotope molecules, in which one or more light water molecules initially associated with a hydration site are replaced by isotope molecules in the contaminated water. Thus, the support medium serves essentially as a carrier for the hydration sites. Thus, various high surface area materials can be used, so long as they are water insoluble and provide a large number of accessible hydration sites. For example, the support medium can be other kinds of synthetic polymers, or natural materials, such as zeolites, aluminas, silicas, etc.

Each hydration site will have at least one, and preferably from about 7 to about 25 waters of hydration and even higher up to almost 50 waters of hydration. Various molecules that form associations with water molecules, i.e., waters of hydration can be used in the present invention. The cationic portion of the hydration site may be non-metallic, e.g., an ammonium cation ($NH_4^+$), or a metallic cation. Of the metal cations, aluminum is especially suitable due to the large number of waters of hydration associated with aluminum salts. However, other cations, such as sodium, magnesium, copper, zinc, cobalt, iron, nickel, manganese, potassium or chromium can also be employed. Depending upon the structure of the support and the manner of its production, the anionic portion of the hydration site molecule can include nitrates, sulfates, chlorides, acrylates, hydroxides, or phosphates. Moreover, a broad array of physical constants for inorganic compounds having varying waters of hydration are to be found in reference handbooks such as *Handbook of Chemistry*, N. A. Lange, Ph.D. Revised 10th Edition, or *CRC Handbook of Chemistry and Physics* D. R. Lide, Ph.D., 77th Edition.

The molecular separation material may be in various physical forms, so long as a large surface area with hydration sites is exposed to the contaminated water. For ease of manufacture and subsequent regeneration, and the availability of a large surface area, the molecular separation material is preferably in the particulate form., e.g. beads of from about 15 mesh to about 400 mesh. Other physical forms, such as gels, can also be used.

The Separation Membrane

Separation of the isotopes may also be effected with the use of a separation membrane, or a separation membrane may be used simultaneously, or in sequence with selective adsorption. Suitable separation membranes have a porosity that is selective for light water molecules. That is, the membrane will allow a greater percentage of light water molecules than isotope water molecules to pass through the membrane when the contaminated water is placed against one side of the membrane. The separation membrane may be formed of various materials, such as cellulose acetate. Other suitable separation membrane materials will become apparent to one skilled in the use of such materials for molecular separation.

When used, the waste or contaminated water is passed against one side of the membrane surface, causing light water molecules, and a relative small percentage of isotope water molecules to pass through the membrane wall. As a result, the percentage of isotope water in the remaining contaminated water is increased. Therefore, the membrane can be used alone to reduce the volume of the contaminated water for subsequent storage, or to concentrate the isotope for treatment with the above-described molecular separation material.

The separation membrane may be positioned for contact with the contaminated water in various ways known to one skilled in the art of using separation membranes, so long as the contaminated water can be conveyed on one side of the membrane, with the light water molecules being permitted to pass through the membrane to the opposite side. Other conditions being the same, the permeation rate of the membrane is directly proportional to the surface area of membrane exposed to the contaminated water.

A preferred configuration for purposes of the present invention is to use a separation membrane in the form of one or more hollow fibers, with the contaminated water being passed through the interior of these fibers. As a result, the light water molecules preferentially pass through the walls of the fibers to the exterior of the fibers for collection.

The separation membrane may be used in combination with the above molecular separation material for sequential or simultaneous water treatment. For example, the contaminated water may be first exposed to the separation membrane to remove a portion of the light water, thereby concentrating the contaminated water stream. The concentrated stream can then be exposed to the molecular separation material, thereby increasing the effectiveness of the molecular separation, since the isotopes comprise a relatively higher percentage of the waste stream.

Alternatively, the contaminated water may be simultaneously subjected to membrane and molecular separation. For example, the membrane can be in tubular form, e.g., lengths of hollow core fiber, and the molecular separation material can be packed into the interior of fiber or tube. The contaminated water can then be conveyed through lengths of the filled tube or hollow core fiber, discharging substantially purified water therefrom with the isotope water molecules, i.e., the oxides of heavy isotopes of hydrogen, being held or trapped within the tube or hollow core fiber for appropriate disposal or regeneration.

Thus, in one embodiment of the invention, the heavy water or tritiated water content of a contaminated water stream is reduced by exposing the stream to a single elongated length or a bundle of hollow core fibers, each of which is at least partially filled or packed with beads of an exchange resin, or other molecular separation material.

Apparatus and Process

The configuration of the apparatus used to practice the process of the invention will vary depending on whether the molecular separation material, the separation membrane, or both, are used. The exact nature of the apparatus will also depend upon the volume of water being treated, the manner of disposal of the water discharge streams, and whether or not the molecular separation material, if used, is to be regenerated.

In general, however, the apparatus will include at least one separation chamber, a supply conduit for conveying contaminated water into the separation chamber from a supply source, and a first discharge conduit for removing treated contaminated water from the separation chamber. For example, when the molecular separation material is used alone, the apparatus may include a separation chamber to hold the molecular separation material, a conduit to feed contaminated water into the separation chamber from a supply source, and a discharge conduit for removing treated water from which a portion of the isotope molecules has been removed. Provision may also be made for periodic replacement of the molecular separation material.

The apparatus may also include a means for regeneration of the molecular separation material to remove adsorbed isotope molecules and regular water molecules. For example, the loaded molecular separation material can be placed in a heated chamber to drive off the isotope molecules and the light water molecules by evaporation. This desorbed or dehydrated molecular separation material can then be used directly, or rehydrated with light water molecules prior to use.

When the separation membrane is used alone, the apparatus will also include a separation chamber in which the contaminated water is passed on one side of the membrane.

The apparatus will also include a supply conduit, a first discharge conduit for conveying the treated water passing through the membrane, and a second conduit for conveying the remaining concentrated water. When the separation membrane is in tubular form such as a hollow fiber, the first discharge conduit is in communication with the exterior of the tubes or fibers, while the second discharge conduit is in communication with the interior of the tubes or fibers.

The two types of apparatus can be joined together for the combined treatment of the contaminated water with the molecular separation material and the separation membrane. For example, a supply conduit can convey water from a supply source to a first treatment chamber containing the separation membrane. Concentrated water from this first stage treatment can then be conveyed to a second separation chamber holding the molecular separation material.

Thus, in one embodiment, the percentage of isotope water molecules in water is reduced by the steps of (a) conveying water containing a percentage of isotope molecules into contact with a molecular separation material having a plurality of hydration sites, (b) substituting or hydrating a portion of the waters of hydration with isotope water molecules, and (c) separating the molecular separation material with associated isotope waters of hydration from the contaminated water.

In another embodiment of the invention, isotope water molecules in water is reduced by the steps of (a) conveying water containing a percentage of isotope molecules into engagement. with one side of a permeable membrane, that allowing selective passage of light water molecules in preference to isotope water molecules, whereby light water molecules and a relatively minor percentage of isotope molecules pass through the membrane, and (b) collecting the concentrated water that did not pass through the membrane.

In the combined process, isotope water molecules in water are reduced by the steps of (a) conveying water containing a percentage of isotope molecules into engagement with one side of a permeable membrane, that allowing selective passage of light water molecules in preference to isotope water molecules, whereby light water molecules and a relatively minor percentage of isotope molecules pass through the membrane, (b) conveying concentrated water that did not pass through the membrane into contact with a molecular separation material having a plurality of hydration sites, (c) substituting a portion of the waters of hydration with isotope water molecules, and (d) separating the molecular separation material with associated isotope waters of hydration from the contaminated water.

Each of the above processes may include additional steps. For example, the first or combined process may further include the steps of (a) regenerating the molecular separation material to separate at least some waters of hydration, (b) collecting isotope water molecules separated from the molecular separation material, and (c) returning the regenerated molecular separation material, with or without rehydration, to the separation chamber.

The present invention is presumed to be based upon a molecular exchange principle of either adsorption or selective adsorption to accomplish the experimental results reported herebelow. Although the co-inventors herein differ on the precise theory of the operation, it is understood that the test results below speak for themselves with respect to the efficacy of the various embodiments of the invention.

OBJECTS OF INVENTION

It is therefore an object of this invention to provide an environmentally safe alternative to the ground or air dispersion of water contaminated with heavy isotopes of hydrogen.

It is yet another object of this invention to provide means for separating heavy isotopes of hydrogen from light water (H20) and tritiated water from heavy water.

It is still another object of this invention to provide a commercially viable apparatus containing a bundle of filled hollow core fiber lengths in a housing for separating heavy isotopes of hydrogen, including tritium, from contaminated water and a method for regenerating said apparatus.

It is another object of the invention to provide a process for separating isotope molecules from water by contacting the water with a molecular separation material that includes hydration sites with associated waters of hydration and methods of regenerating same for reuse.

Another object of the invention is to provide a process for separating isotope molecules from water by concentrating the isotope molecules using a separation membrane, and contacting the concentrated water with a molecular separation material that includes cation sites with associated waters of hydration and regeneration thereof.

In accordance with these and other objects, which will become apparent hereinafter, the instant invention will now be described with reference to the accompanying drawings.

BRIEF DESCRIPTION OF THE DRAWINGS

FIGS. 4A, 4B and 4C show simplified schematic views of the invention depicting a resin particle selectively absorbing heavy water isotopes, in this example HTO. The adsorption is selective in three instances, 4A starting from a dry condition, 4B starting from an initially prewet with pure water condition, 4C in an intermediate condition where the resin has additional capacity to adsorb before saturation.

FIG. 16 is a graphical comparison of the adsorption effectiveness of PSDVB resins loaded with aluminum, magnesium, chromium and sodium metal sites.

FIG. 24 is a graph of the results achieved in regenerating tritium oxide saturated acrylic resin loaded with sodium and aluminum hydration sites using a fluidized bed dryer.

DETAILED DESCRIPTION OF THE INVENTION

In the following description, terms such as horizontal, upright, vertical, above, below, beneath and the like, are used solely for the purpose of clarity in illustrating the invention, and should not be taken as words of limitation. The drawings are for the purpose of illustrating the invention and are not intended to be to scale.

Figure 1:
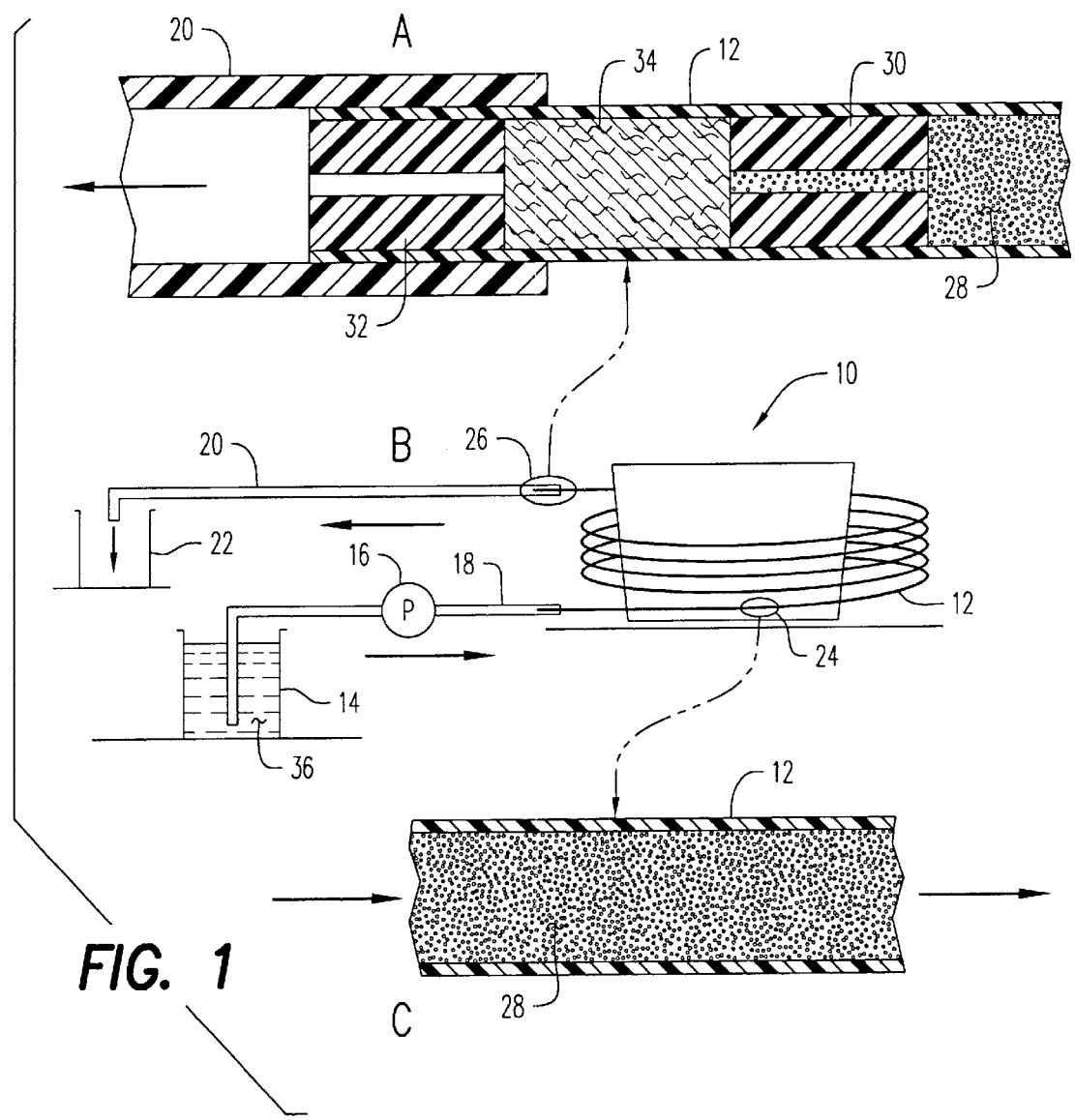
FIG. 1 is a simplified schematic view of the apparatus 10 shown in FIG. 1B, enlargements of portions thereof shown in FIGS. 1A and 1C.

Referring now to the drawings, the apparatus is shown generally at numeral 10 in FIG. 1B and includes a length or coil of hollow core fiber 12 which is formed of cellulose acetate and is otherwise well known in the industry. The particular features of this hollow core fiber 12 used in the experiments reported below are an inside diameter of 1.3 mm (range of 1–3 mm), a wall thickness of 0.2 mm (range of 0.05 to 0.20 mm), an outside diameter of 1.7 mm, and a density of 1.20 g/cm³.

An inlet end of the hollow core fiber length 12 is connected to a plastic feed line 18 leading to a tank 14 filled with water contaminated with heavy isotopes of hydrogen, namely deuterium oxide. This contaminated water 36 is pumped in the direction of the arrow by pump 16 through connecting plastic tubing 18 into the hollow core fiber length 12. Radioactive tritium is unavailable for routine, unregulated use, but because the tritium oxide molecule is much larger than both hydrogen oxide and deuterium oxide, the results reported herebelow for deuterium oxide separation apply at least equally well for tritium separation.

It should be noted that other water permeable membranes may be utilized, the requirement being having a pore size and molecular composition sufficient to substantially allow permeation of H2O therethrough while substantially preventing permeation of heavy isotopes of water, namely deuterium and tritium in their oxide forms.

The hollow core fiber 12 as best seen in FIG. 1C is filled or packed with separate beads 28 which are formed form an ion exchange resin as described herebelow. The outlet end of the hollow core fiber length 12 is connected to a length of plastic tubing 20 which discharges the processed and purified water into a separate container 22 as it flows from the hollow core fiber 12.

To prevent the exchange beads 28 from being forced out of the hollow core fiber length 12, a filter or trap is connected at the discharge end thereof as shown in FIG. 1A, an enlargement of area 26 of FIG. 1B. Two spaced apart plastic tubes 30 and 32 each having a small longitudinal aperture centrally therethrough, are positioned within the outlet end of the hollow core fiber length 12. These plastic tubes 30 and 32 are spaced apart by a quantity of packed cotton 34 so that none of the exchange beads 28 will flow beyond plastic tubing member 30, yet without substantially restricting the flow of processed water flowing out of the hollow fiber core length 12 into tube 20 in the direction of the arrow.

Exchange Resin Beads

Details of the content and method of producing the ion exchange beads formed of cross linked styrene divinyl benzene polymer are disclosed in detail in Patterson's earlier U.S. Pat. No. 5,036,031 which is incorporated herein by reference.

Loading Procedure for Ion Exchange Resin Beads

The procedure described herebelow was used to load cross-linked ion exchange beads with aluminum. It will be understood that the same reaction will be used to add other metal sites instead of aluminum and basically required reaction of the sulfonated or phosphonated resin with a salt, e.g., a sulfate or nitrate salt, in which the metal to be used for the site is cation. The procedure was applied for R $SO_3H$ with 2%, 3%, 3.25%, 4%, 8%, 10% and 12% cross-linking, 60 mesh, 100–200 mesh and 200–400 mesh screened for size.

Pretreat Beads

The beads were first cleaned with hydrochloric acid (2% HCl) to take out all residual cations. Ion exchange with HCl will take out Al and other metal ions which were on the beads as shown by the formula:

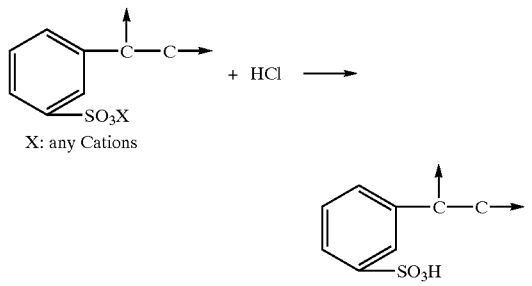

X: any Cations

The beads are then rinsed with D.I. water until the pH returns to 5–6. This will remove the XCl.

in an oven at approximately 100° C. for three days in order to drive out all residual water. Three separate lengths of hollow core fiber 12 were then filled with a prepared mixture of light water ($H_2O$) and deuterium oxide in a ratio of approximately 61% $D_2O$ by volume which was taken from a supply bottle used for the entire experiment to insure consistency. The pump rate of the deuterium oxide contaminated water was set at 2 ml per hour using a constant rate high pressure pump 16.

The effluent discharging into container 22 was then analyzed. This effluent was split into separate samples taken at specific time periods from the start of each experiment. These time spaced samples were taken to provide an indication of the variability of the separation capability of the apparatus 10 over time. The test data taken is shown in Table 1 herebelow.

TABLE 1

HOLLOW CORE FIBER PACKED WITH ION EXCHANGE RESIN BEADS

| ION EXCHANGE RESIN | VOLUME OF AFFLUENT (ml) | ELAPSED TIME (HRS) | FREEZING POINT (° C.) | CORRES. % OF $H_2O$ | ACCUM. VOL. (ml) |
|---|---|---|---|---|---|
| $(RSO_3)_3Al$ (12% x-L) | 2 | 1 | 2.011 | 52.64 | 2 |
| " | 2 | 2 | 1.801 | 47.15 | 4 |
| " | 2 | 3 | 1.983 | 51.91 | 6 |
| " | 0.5 | 3 1/4 | 1.701 | 44.53 | 6.5 |
| $(RSO_3)_3Al$ (4% x-L) | 0.5 | 2 | 0.312 | 8.17 | 0.5 |
| " | 2 | 3 | 1.979 | 51.81 | 2.5 |
| " | 2 | 4 | 2.248 | 58.85 | 4.5 |
| " | 1 | 5 | 2.255 | 59.03 | 5.5 |
| " | 0.5 | 5 1/4 | 2.254 | 59.01 | 6 |
| $(RSO_3)_3Al$ (2% x-L) | 0.25 | 2 | 0.148 | 3.87 | 0.25 |
| " | 6.3 | 5 | 2.028 | 53.09 | 6.55 |
| " | 0.9 | 5 1/2 | 2.101 | 55.00 | 7.45 |
| " | .8 | 6 | 1.856 | 48.59 | 8.25 |
| $(RSO_3)NH_4$ (2% x-L) | 1 | 2 | 1.777 | 46.52 | 1 |
| " | 3 | 4 | 2.267 | 59.35 | 4 |
| " | 1.5 | 5 | 2.264 | 59.27 | 5.5 |

Load Beads with Al

Prepare a solution of $Al_2(SO_4)_3$ and, preferably warmed D.I water. Apply this solution to the beads to produce this reaction:

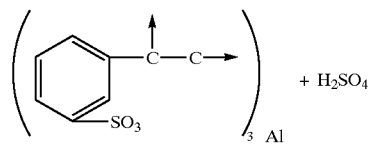

Rinse the loaded beads with D.I. water until the pH returns to 5–6. The beads were initially treated prior to loading into the hollow core fiber.

After the ion exchange beads 28 were pretreated as above described, the hollow core fiber length 12 was loaded therewith. The loaded hollow core fiber length 12 was dried

Graphic Display of Data

Figure 2:
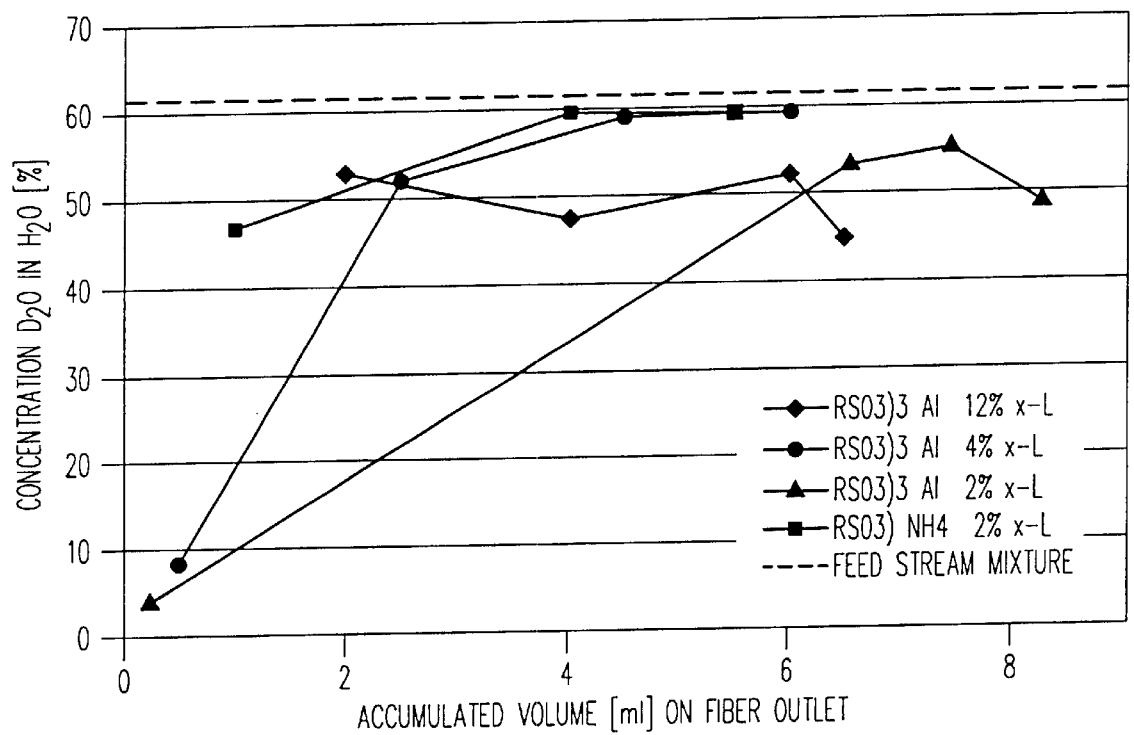
FIG. 2 is a graphic summary or composite of the effectiveness of the invention in reducing the deuterium oxide level in contaminated water using a cross linked (X-L) ion exchange resin loaded with aluminum.

This test data is also shown graphically in FIG. 2 which is a composite of all of the performance data taken depicting separation capability of each of the ion exchange resins utilized in these experiments. Again, the contaminated test water was all taken from a common prepared source.

The concentration of deuterium oxide is depicted as a volumetric percentage of the total affluent sample volume and is determined by carefully establishing the freezing point of each sample. The freezing point of pure light water is 0.0° C. while the freezing point of pure deuterium oxide ($D_2O$) is 3.82° C. The freezing point measurements were taken utilizing an Advanced Instruments Osmometer, Model 5600. The conversion from freezing point to percent deuterium oxide was shown to be a linear relationship.

In reviewing these graphic performance data shown in FIG. 2, the 2% cross-linked sample with aluminum showed the greatest change or decrease in the deuterium oxide level from 61% by volume down to less than 4% deuterium oxide concentration in the first sample taken after two hours of system operation. Note that with respect to both the 2% and 4% cross-linked exchange resin combined with aluminum, after three to five hours of operation, the second and subsequent samples taken demonstrate substantially higher concentrations of deuterium oxide, indicating that the apparatus is most effective in removing deuterium oxide (and presumably oxides of tritium) from the contaminated water within the first period of operation.

Combined Exchange-Membrane Separation

The separation of isotopes and molecules as above described is affected by the combination of the process of selective adsorption on a resin and the selective permeation through the walls of the hollow core fiber membrane. The resin particles or beads as above-described are contained within the hollow core fibers and, of particular importance, may be regenerated without the need for removal of the resin from the hollow core fibers.

Figure 3:
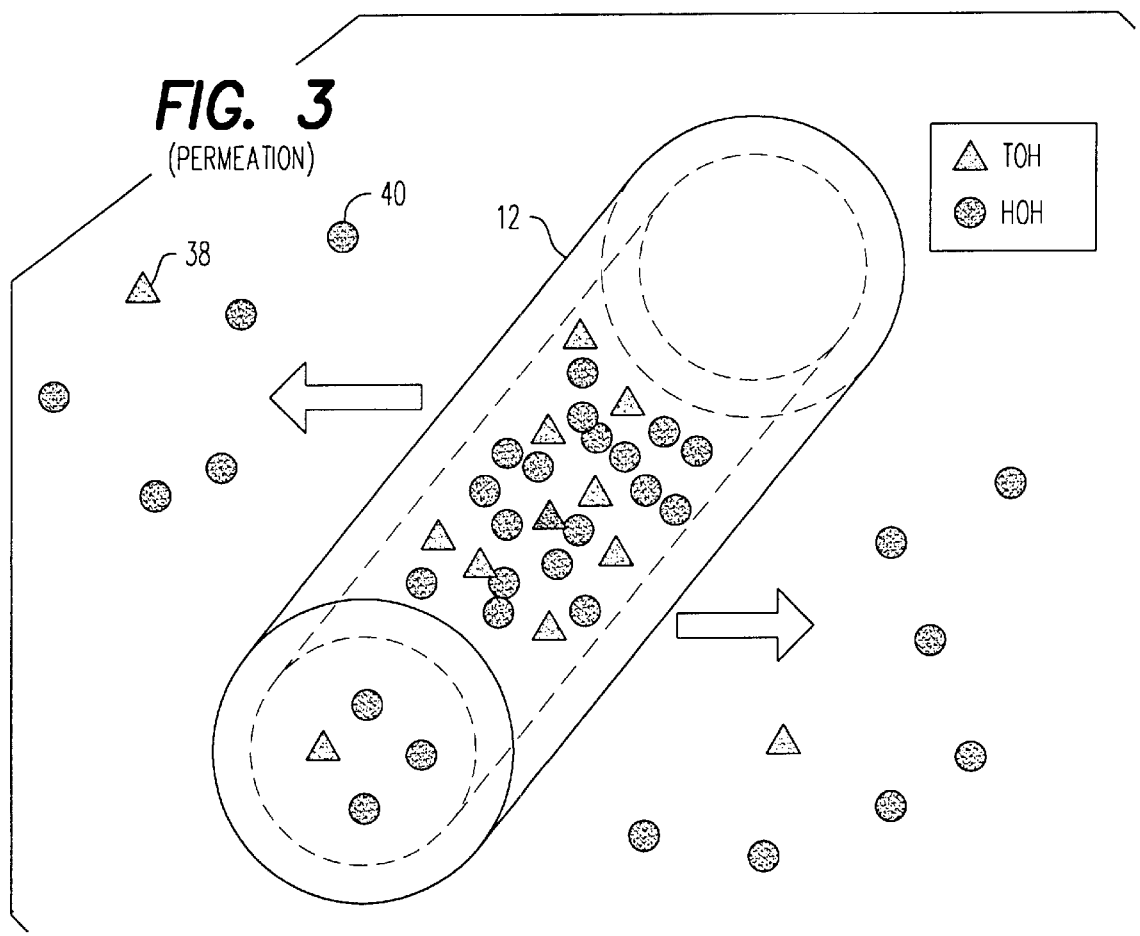
FIG. 3 is a perspective schematic view depicting one aspect of the tritium and deuterium oxide separation process of the present invention, that being permeation through the walls of the hollow core fiber.

Referring now to FIG. 3, a pictorial view of a section of hollow core fiber 12 is there shown as previously described. Water molecules HOH depicted as circles at 40 permeate through the hollow core fiber wall faster than do the tritium oxide (TOH) molecules shown as triangles at 38. A substantially higher number of water molecules 40 permeate outwardly through the hollow core fiber wall than do the larger tritium oxide molecules 38.

In FIGS. 4A, 4B and 4C, the adsorption aspect of the present invention is there depicted as a second separation agent. Each of the above described resin beads or particles 28 shown in FIG. 4A include cation sites M having the ability to hydrate. Each resin particle also contains hydrogen H as an essential aspect of these polymer resins. The resin can be in three typical initial states. In FIG. 4A, the resin is initially dry. When contacted with a mixture of water isotopes, the tritium oxide (HTO) is preferentially adsorbed as a water of hydration and the feed solution is thus depleted in HTO. In FIG. 4B, the resin is initially prewet with water and the tritiated water replaces some of the existing waters of hydration. In FIG. 4C, the resin is initially partially saturated with respect to the feed concentration. An additional tritiated water replaces a preexisting water of hydration. In all cases shown above, there is the probability of some tritium replacement of hydrogen on the molecular structure. This is depicted as one T atom on the final resin particle. Some supports will have cation sites and no exchangeable hydrogen atoms, such as alumina or silica with and without additional cations. In these cases, there would be no tritium atomic exchange with the support. Note also that the adsorption is reversible; thus, a resin which was saturated at a high HTO concentration would desorb HTO if contacted with water having a lower concentration of HTO.

Figure 5:
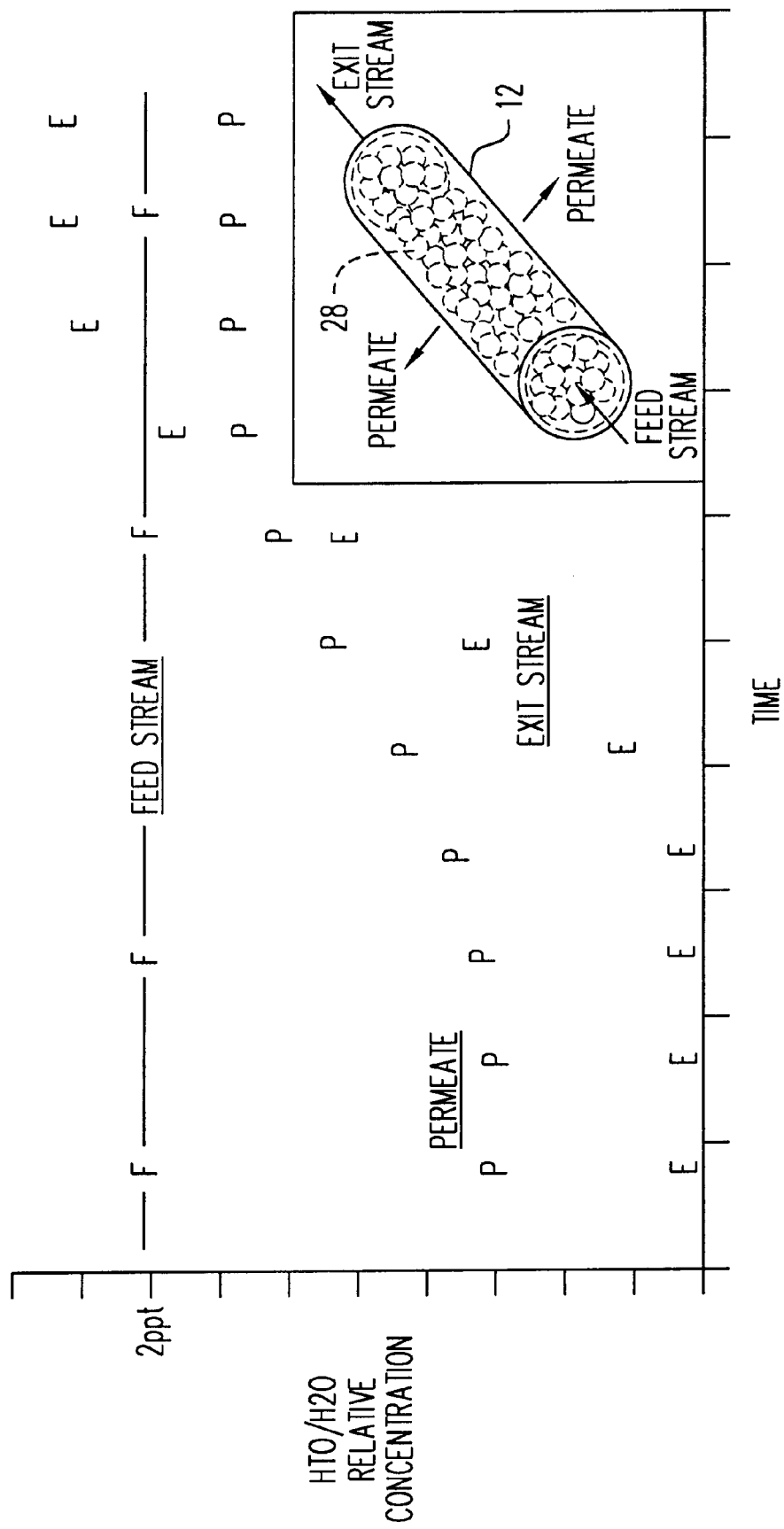
FIG. 5 is a simplified example of a typical set of water contaminate adsorption curves with respect to both contaminant separation aspects or mechanisms of the present invention.

Test performance results may be generalized as shown in FIG. 5. A section of resin filled hollow core fiber 12 is shown in the insert of this graph for reference. The feed stream flows into one end while the exit stream flows out of the other end of the hollow core fiber 12 as shown. The permeate passing through the hollow core fiber walls is also shown. The feed stream has an initial and constant concentration of tritium oxide as shown by the symbols F. The typical level of tritium oxide in the permeate is shown by the letter P over time, while the concentration level of tritium oxide in the exit stream over time is shown by the letters E. Note that the tritium oxide level in the permeate P does not raise or increase to the concentration level of the feed stream F but, at some point in time, the exit stream tritium oxide concentration E exceeds that of the feed stream F. This is likely due to the fact that the resin beads 28 initially absorb and hold a high level of tritium oxide, but eventually become saturated.

Figure 6:
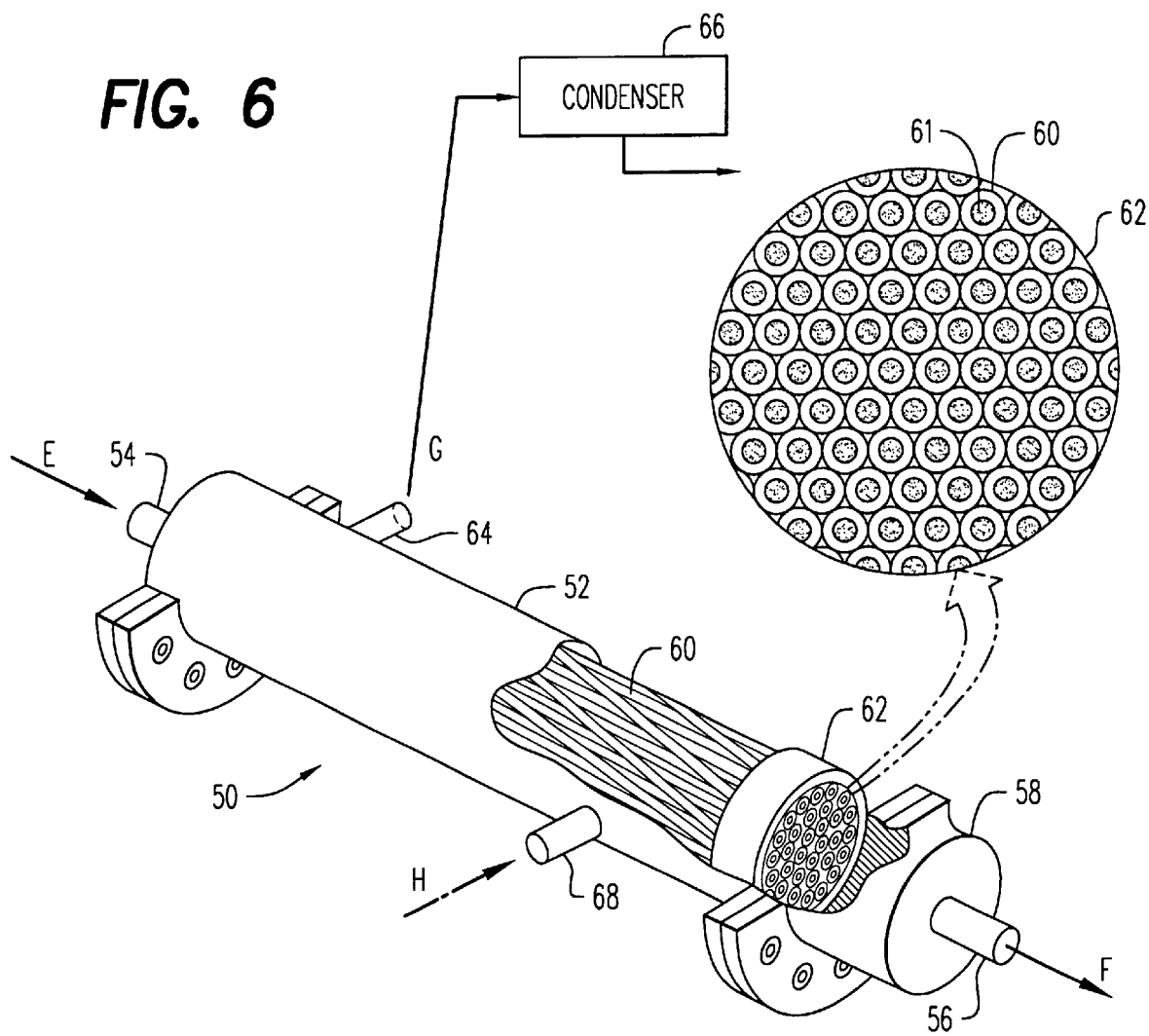
FIG. 6 is a simplified perspective view of one commercial embodiment of the invention using separation membranes.

A commercially viable embodiment of the invention is shown generally at numeral 50 in FIG. 6. This commercial module 50 includes an elongated tubular housing 52 having a header 58 sealingly connected at each end thereof which supports an inlet tube 54 and an outlet tube 56, respectively. Positioned within the housing 62 is a bundle of elongated hollow core fibers 60, each of which is filled with ion exchange resin beads as previously described. This bundle of hollow core fibers 60 is held together by header 62 at each end thereof and positioned within housing 52. The feed stream enters the device 50 at inlet 54 in the direction of arrow E, while the exit stream flows into the direction of arrow F from outlet 56. Headers 62 insure that all of the feed stream liquid flows through and not outside of the hollow core fiber members 60. Separately, permeate flows from permeate outlet 64 in the direction of arrow G to a condenser 66.

The experimental test results reported herebelow utilize this experimental module in developing the data shown in FIGS. 11 to 14. The test module 50 includes thirty two such hollow core fibers 60 filled with ion exchange resin particles 61. Each of the fibers were eight feet in length. The feed stream had a $D_2O$ concentration of 4.85 percent by weight within water. The experimental results are described more fully herebelow.

Figure 9:
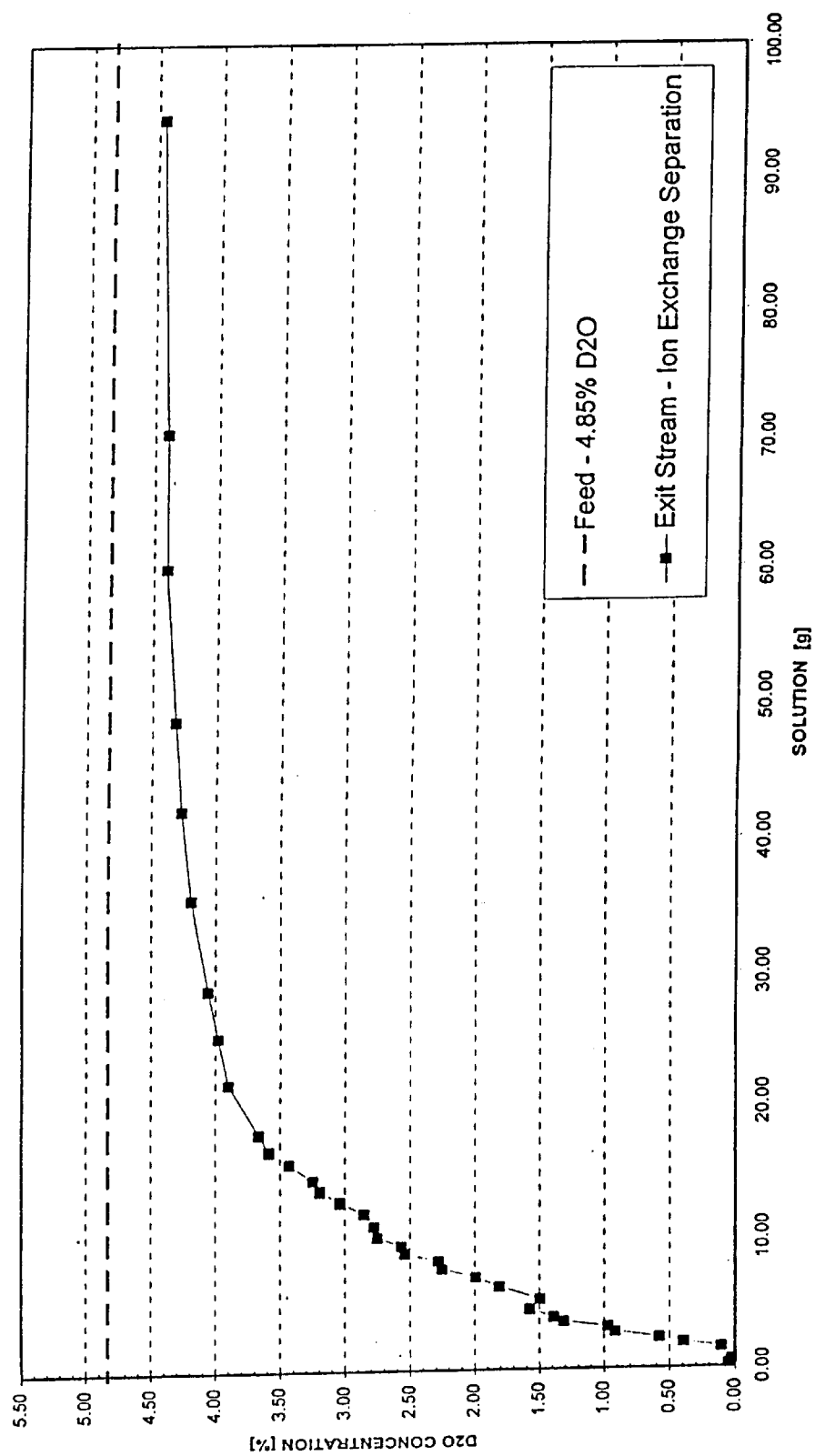
FIG. 9 is a graphic presentation of the test performance of a prototype apparatus similar to the embodiment of the invention shown in FIG. 10 showing a graphic comparison between the feed and exit stream concentrations of D20 contaminated water during a second test run after regeneration.

Still referring to FIG. 6, the apparatus 50 may be regenerated when the ion exchange resin bead 61 packed within each hollow core fiber member 60 becomes saturated as previously described in FIG. 9. Saturation may be determined by sensing the D2O and/or the TOH concentrations in the exit stream. To regenerate the resin, the feed stream is interrupted and, preferably, the apparatus 50 is emptied of fluid. Thereafter, a stream of hot air is forced into inlet 68 in the direction of arrow H. Heated air can also be introduced through inlet 54 and removed through outlet 56 and/or outlet 64. The heat releases waters of hydration TOH and H2O. When the humidity of the heated air exiting the housing 52 at outlet 64 reaches a predetermined humidity level, the exit gas would flow to a separate high capacity condenser (not shown in FIG. 10) to condense the maximum amount of water from this exit airstream.

Figure 7:
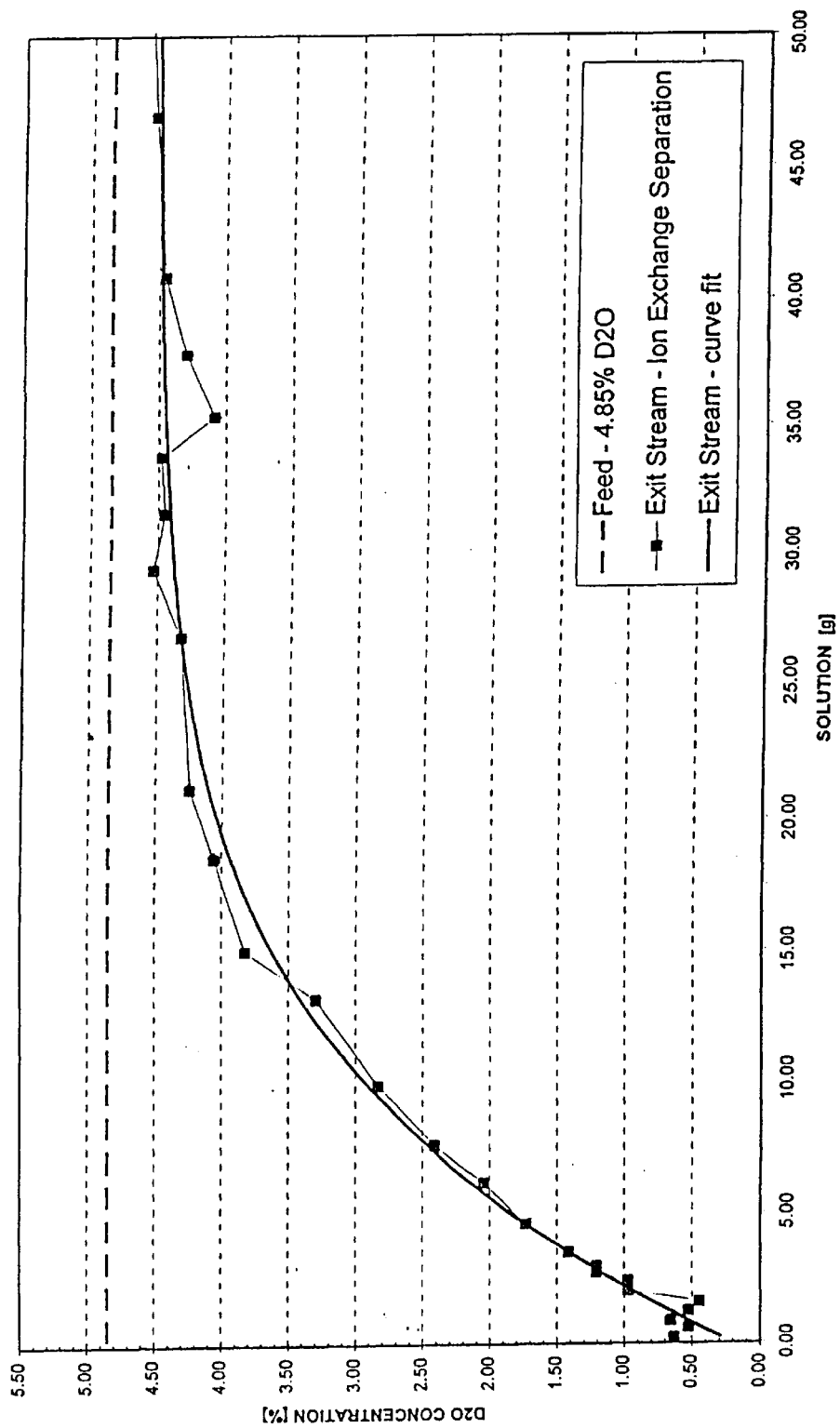
FIG. 7 is a graphic presentation of the test performance of a prototype apparatus similar to the embodiment of the invention shown in FIG. 10 showing a graphic comparison between the feed and exit stream concentrations of D20 contaminated water.
Figure 8:
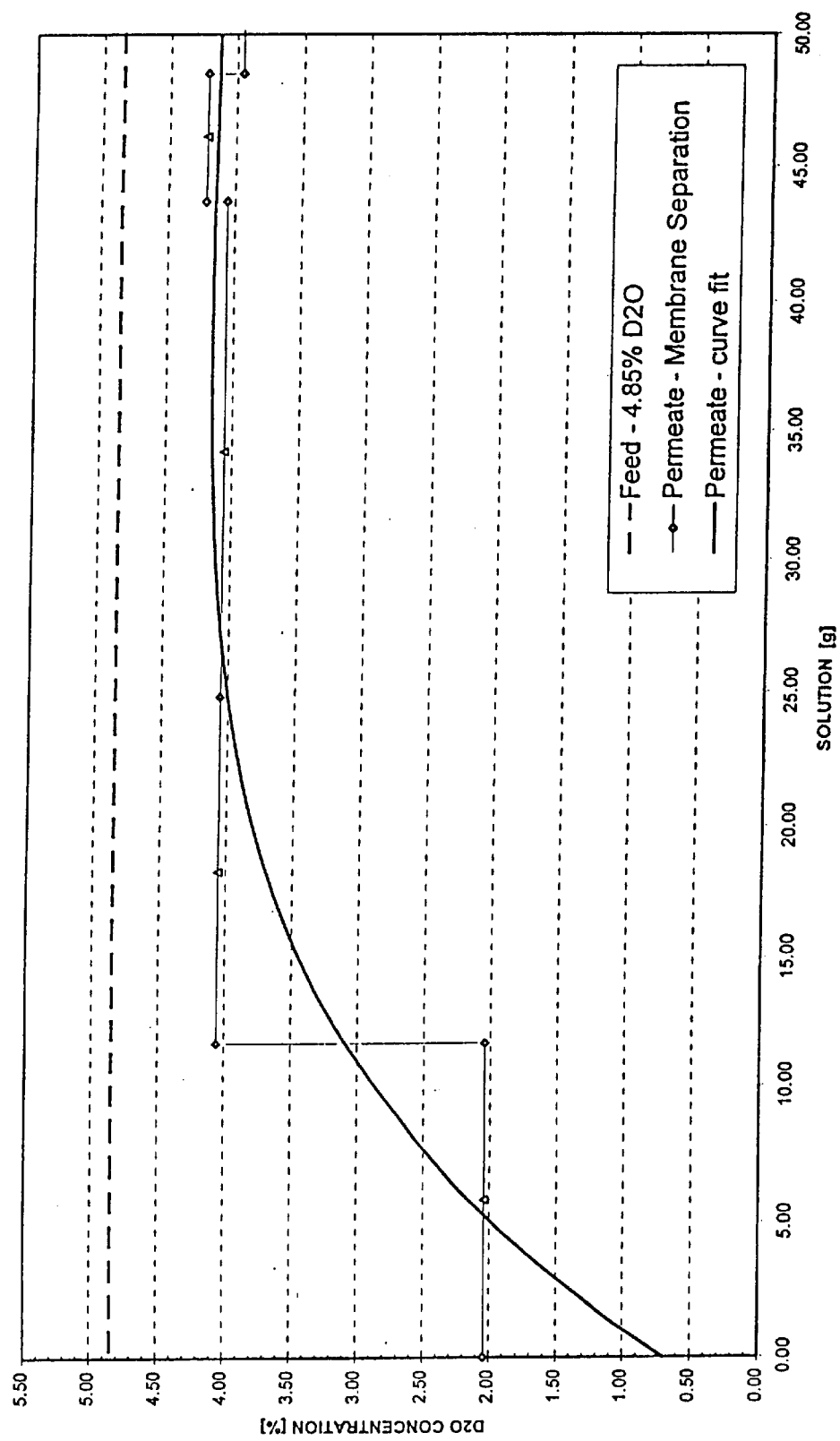
FIG. 8 is a graphic presentation of the test performance of a prototype apparatus similar to the embodiment of the invention shown in FIG. 10 showing a graphic comparison between the feed and permeate stream concentrations of D20 contaminated water.
Figure 11:
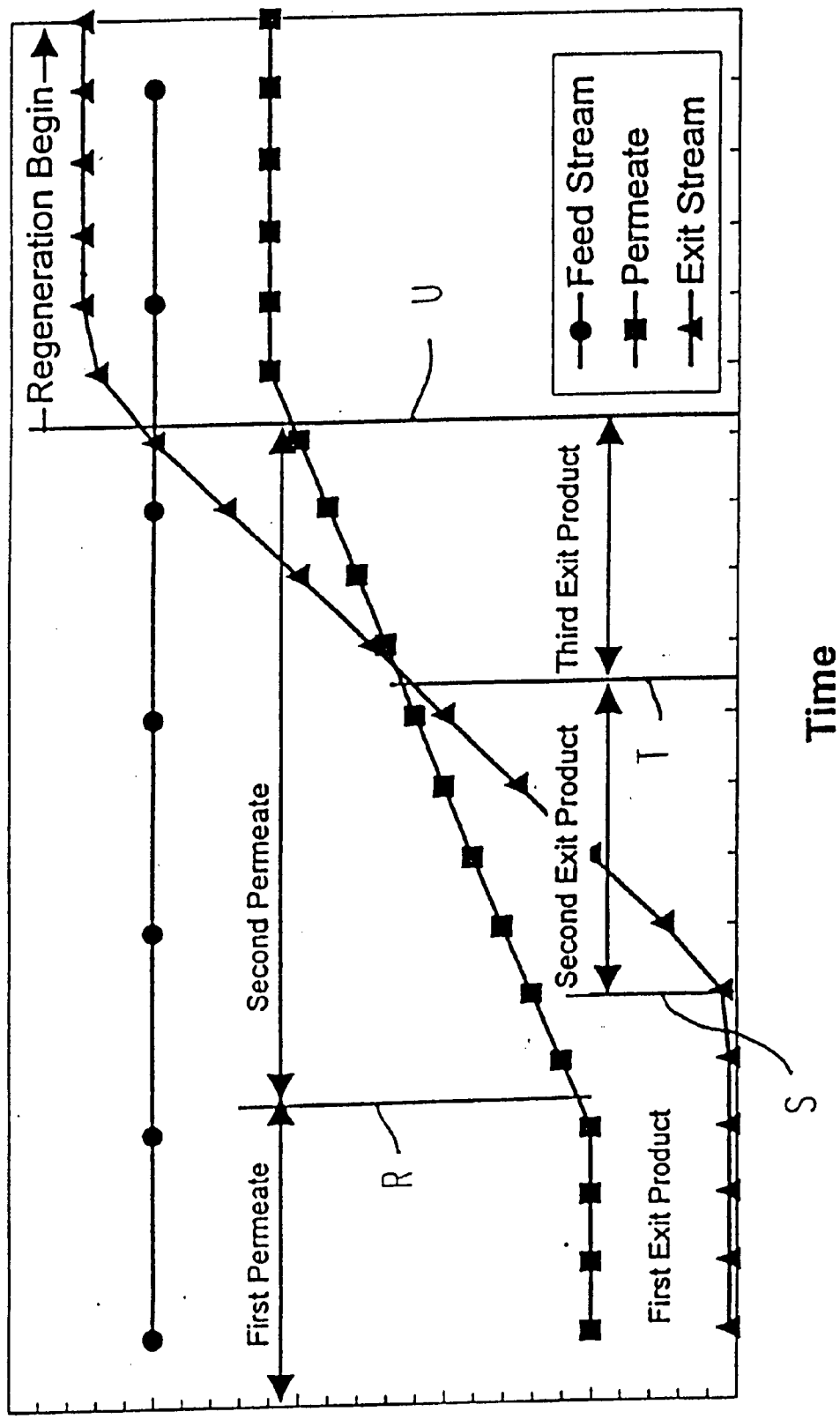
FIG. 11 is a graphic presentation of a typical set of performance curves of the invention depicting the various stages of performance effectiveness of both the exit stream and the permeate.

Referring now to FIGS. 7 and 8, the above described module 50, having thirty two columns of hollow core fiber members 60 longitudinally arranged and packed therein, were test run utilizing a feed stream of light water contaminated with 4.85% D2O by weight. The D2O concentration of the exit stream was monitored and is shown in FIG. 11 with respect to the exit stream flow shown by weight (g) over time.

In FIG. 8, during the same experiment, the concentration of the permeate as a function of total permeate flow by weight (g) is there shown. With respect to both the exit stream and the permeate, the D2O concentrations were initially very low indicating a very high efficiency in D2O separation from water which gradually decreased over time.

Figure 10:
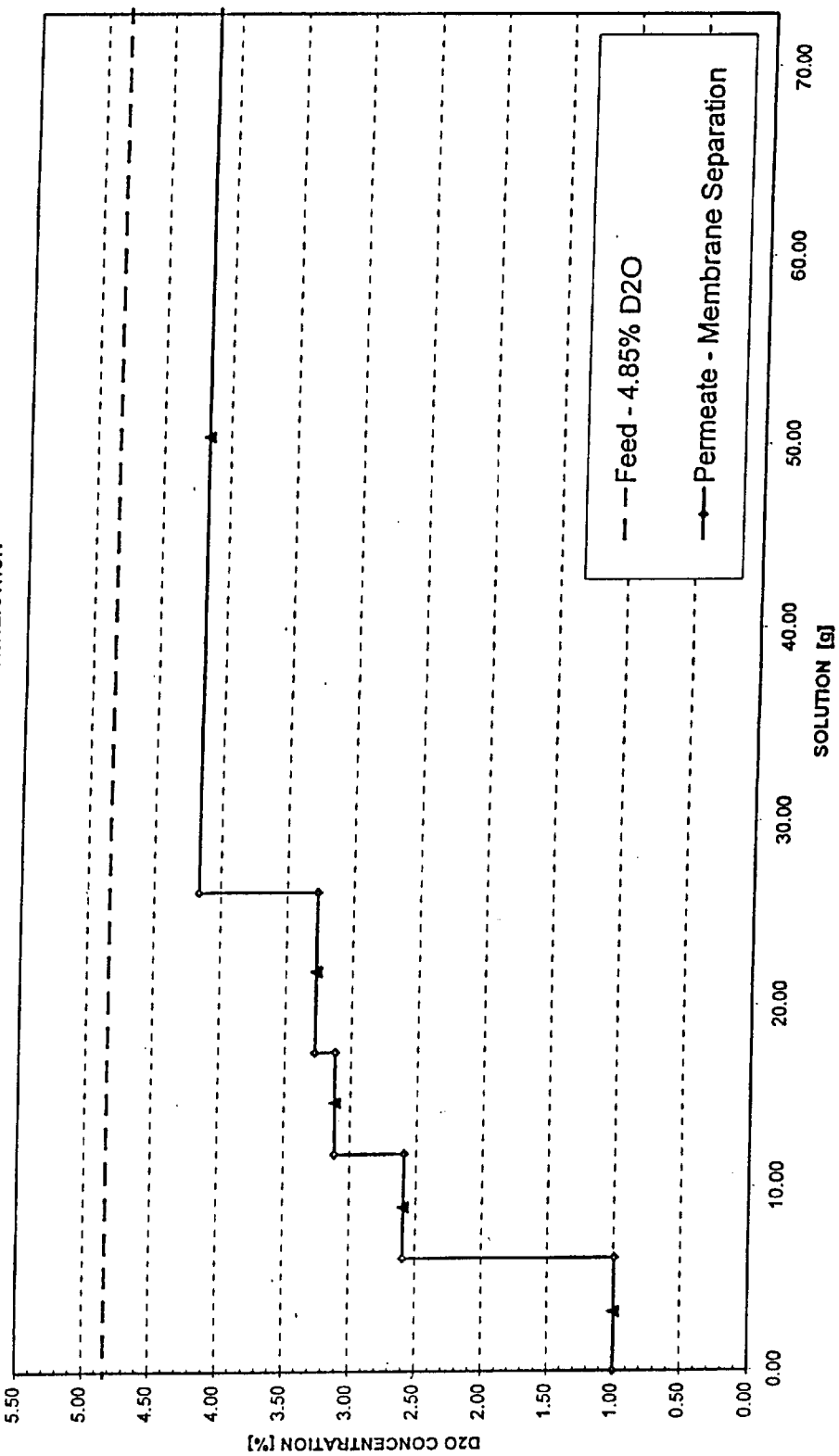
FIG. 10 is a graphic presentation of the test performance of a prototype apparatus similar to the embodiment of the invention shown in FIG. 6 showing a graphic comparison between the feed and permeate stream concentrations of D20 contaminated water during a second test run after regeneration.

Referring now to FIGS. 9 and 10, the same experiment utilizing the same module 50 having thirty two columns of hollow core fiber members filled with the same ion exchange resin was retested. Prior to this retest, the airflow regeneration process above described was completed.

In comparing the test results of the first run to the second run after regeneration, it is noted that, with respect to the exit stream concentrations shown in FIGS. 7 and 9, the greatest reduction in $D_2O$ was 90% on the first run, increasing to virtually 100% in the second run after regeneration. Likewise, comparing FIGS. 12 and 14, the permeate concentration on the first run showed a maximum near test onset of 55%, increasing to above 60% D2O reduction in the initial sampling after regeneration.

Commercial System

To commercialize the present invention, it is useful to divide the separation performance curves with respect to both the exit stream and permeate into sections or segments as shown in FIG. 11. With respect to the exit stream, the first exit product with the highest reduction in heavy water concentration ends at time S. Second exit product and third exit product stages end at times T and U, respectively. After time U, it is recommended that each module be taken out of service and regenerated as above described.

With respect to the permeate, there is also a high efficiency time period ending at time R during which the contaminant reduction is at a maximum. During the second permeate stage between time R and U, the decrease in contaminate removal is generally steady and of a very useful nature. Obviously, although the permeate would continue to be at a contaminate level below that of the feed stream, the module should be regenerated because the exit stream would then contain a higher contamination level than that of the feed stream.

Figure 12:
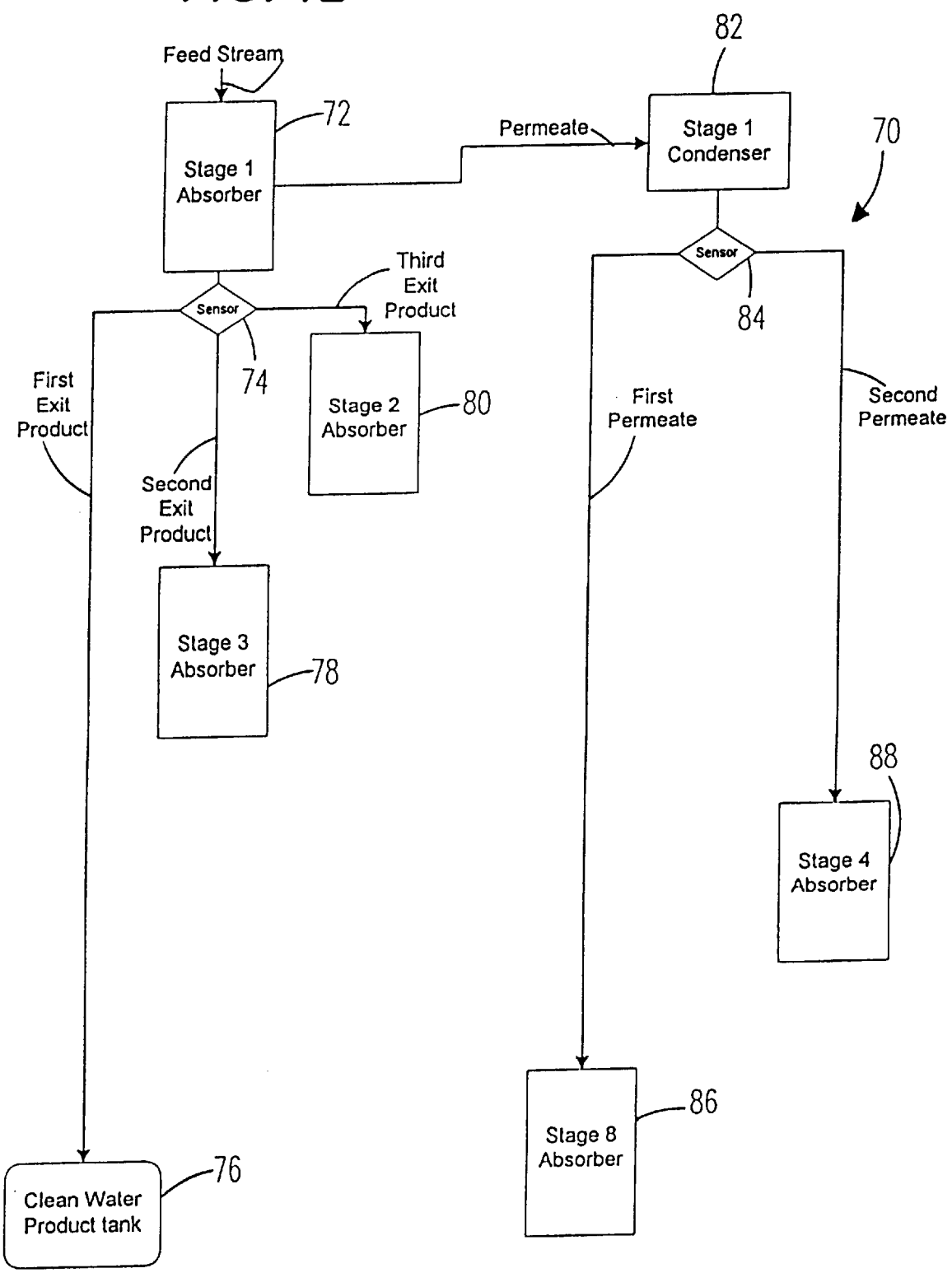
FIG. 12 is one example of a typical commercial system embodying the invention.

Putting these concepts of stages into effect, referring to FIG. 12, one example of a commercial system is shown generally at numeral 70. The feed stream enters a stage 1 absorber 72, the exit stream therefrom being monitored for contamination level at sensor/valve 74. The first exit product will be directed to a clean water product tank 76. When the sensor/valve 74 indicates that the contaminate removal level is declining as after time S in FIG. 15, the exit stream will then be redirected as a second exit product to a stage 3 absorber at 78. When the sensor 74 detects a contaminate concentration level at time T in FIG. 15, the exit stream is again redirected into a stage 2 absorber 80.

The permeate from the stage 1 absorber 72 will be directed into a stage 1 condenser 82. Condensed liquid will pass through sensor 84 which will direct the first permeate having a relatively low level of contamination up to time R as shown in FIG. 15 into, for example a stage 8 absorber 86. At time R, when the concentration of contaminates begins to rise, the second permeate will then be redirected into a stage four absorber 88.

A typical plant or commercial facility of this nature may have between five and fifteen absorber stages dependent upon overall separation desired, each of which will receive different specified amounts of contaminate concentration for further processing or use as desired.

Regeneration

Figure 13:
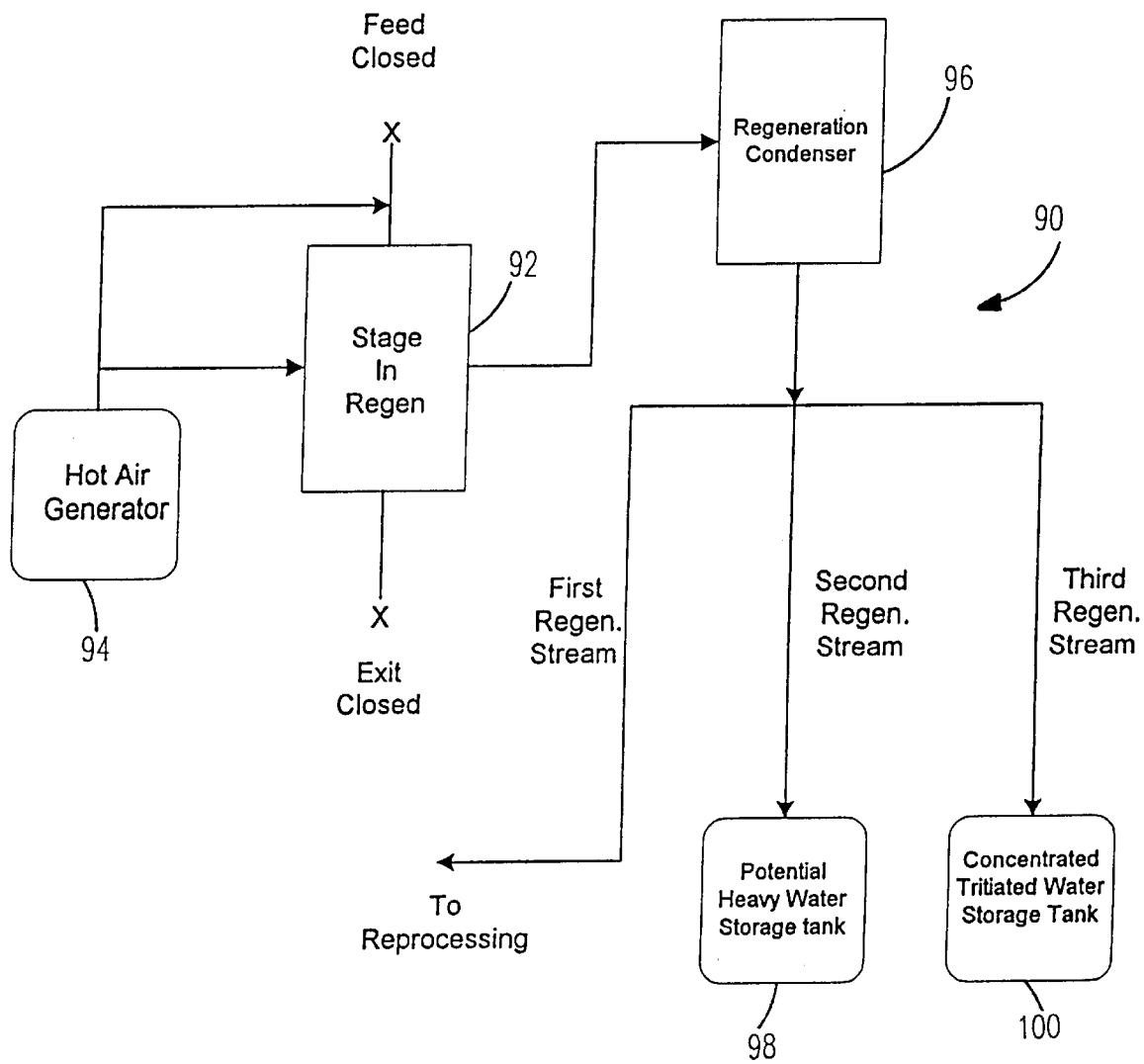
FIG. 13 is an example of a commercial system for regeneration of the contaminate separation apparatus of the invention.

In a typical regeneration process shown in FIG. 13, each stage or module in a typical system like that shown in FIG. 12 is shown typically at numeral 92. During regeneration, hot air from a hot air generator 94 is directed into the module 92 as shown by the arrows. Hot air flowing through the module 92 will remove the liquid within the exchange resin of each of the hollow core fiber members by releasing waters of hydration H2O, HTO, D2O, DTO and HDO which are carried from the module 92 into a regeneration condenser 96. The liquid condensed and discharging from regeneration condenser 96 during the initial time portion of the regeneration cycle will have the least amount of contaminants in this first regeneration stream and may be returned to the system 70 of FIG. 12 for reprocessing. The second regeneration stream carrying higher amounts of contaminants would be collected at 98, while the third or last regeneration condensate stream would likely be carrying the greatest amount of contaminants such as tritiated water and would be directed to storage tank 100 for appropriate disposal.

To further distinguish the contaminant levels of each of these permeate condensate regeneration streams, the temperature of the air exiting the hot air generator 94 may be gradually increased and/or pressure reduced in steps to provide a greater driving force for contaminant removal. The regenerated resin and fiber system is returned to the adsorption cascade and is rehydrated by the feed stream. The adsorption and regeneration cycles are repeated as desired.

Figure 14:
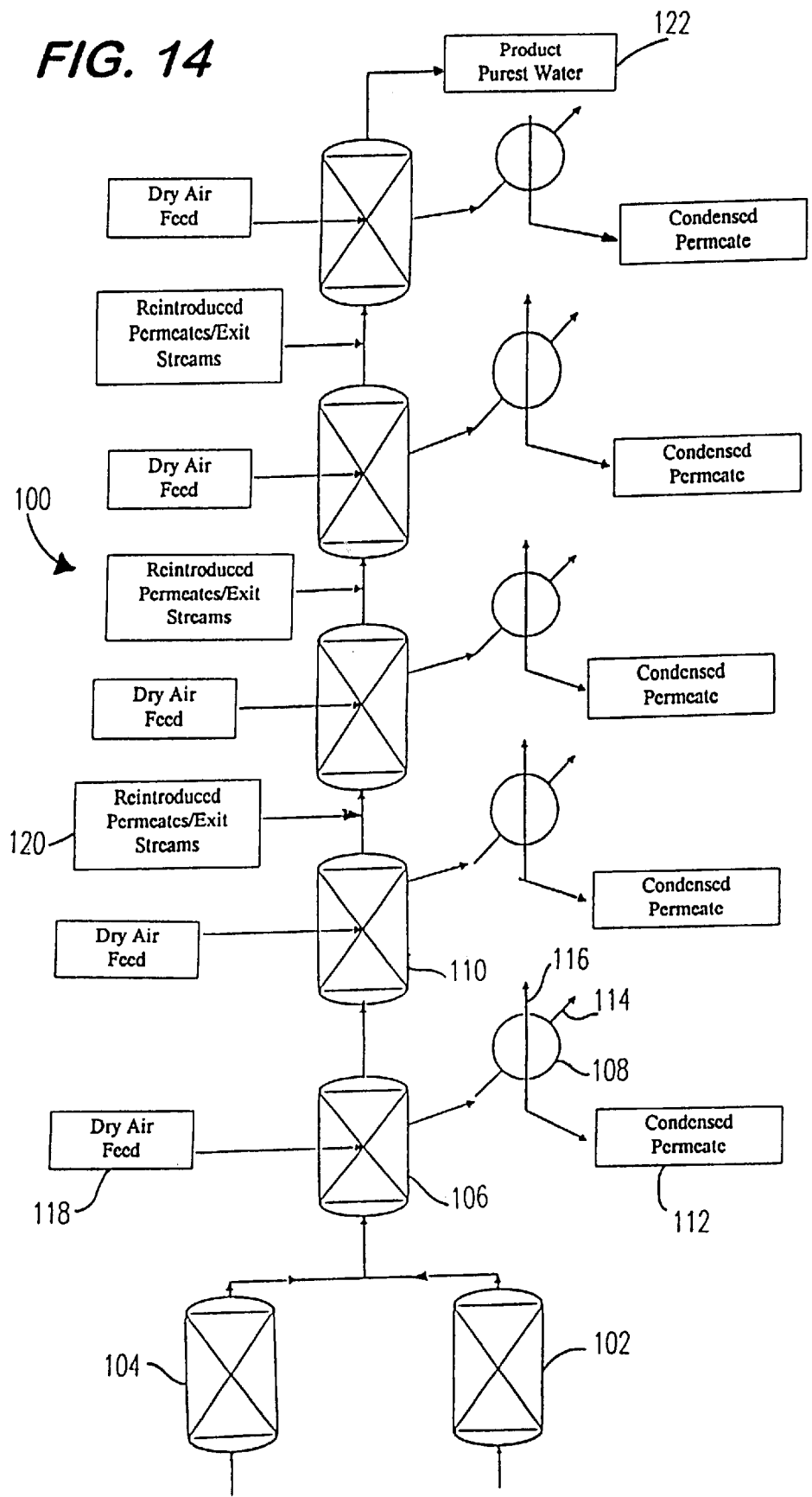
FIG. 14 is a schematic view of a commercial system for both contaminate adsorption and sequential regeneration.

FIG. 14 illustrates an overall system for both deuterium and tritium removal from the water contaminated with same is there shown. This system 100 may include prefilters 102 and 104 in the form of either commercial reverse osmosis units or deionization units for pretreating the feed stream entering the stage 1 contaminate separating module 106. Its exit stream enters the stage 2 module 110 and so forth in upward cascade fashion until the final feed stream exits into a container 122 which collects the purest of the processed contaminated water. Permeate from each of the modules is typically collected at condenser 108 and then collected into condensed permeate tank 112 or exiting from 114 or 116 as other stages of contaminated permeate previously described.

Each of the modules may be selectively bypassed as the exit stream contamination level reaches the contamination level of the feed stream for regeneration. Disconnected from the system 100, a typical hot dry air feed 118 forces hot air directly into each separation module during the regeneration cycle previously described. To further decontaminate the condensed permeate collecting in each permeate tank 112, it may be reintroduced at 120 into the feed stream between adjacent modules 110 according to the contamination level of the permeate condensate.

Figure 15A:
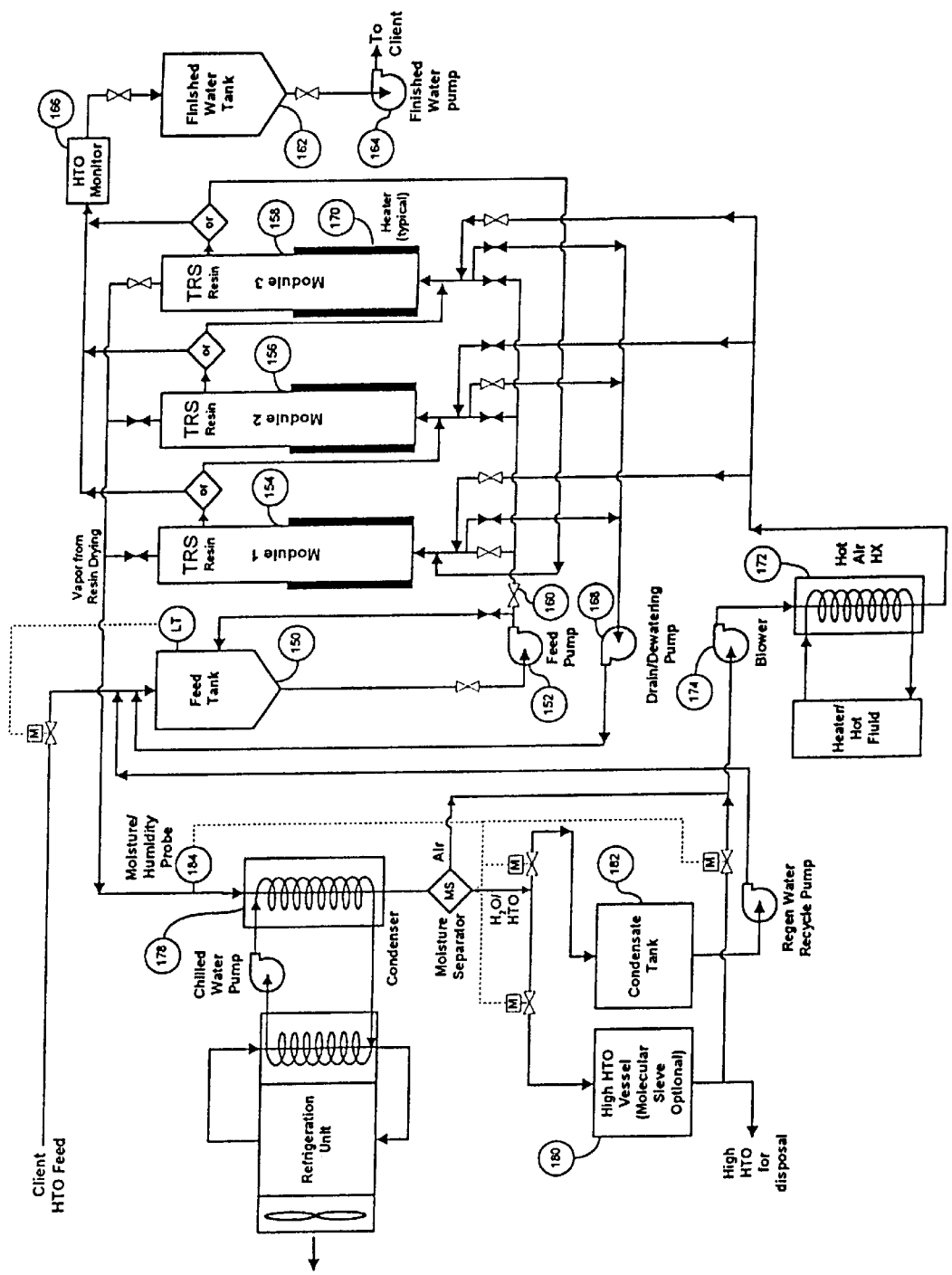
FIGS. 15A and 15B are schematic views of another commercial system in which the isotope molecules are separated by using multiple modules or chambers that contain the molecular separation material and internal and external regeneration.
Figure 15B:
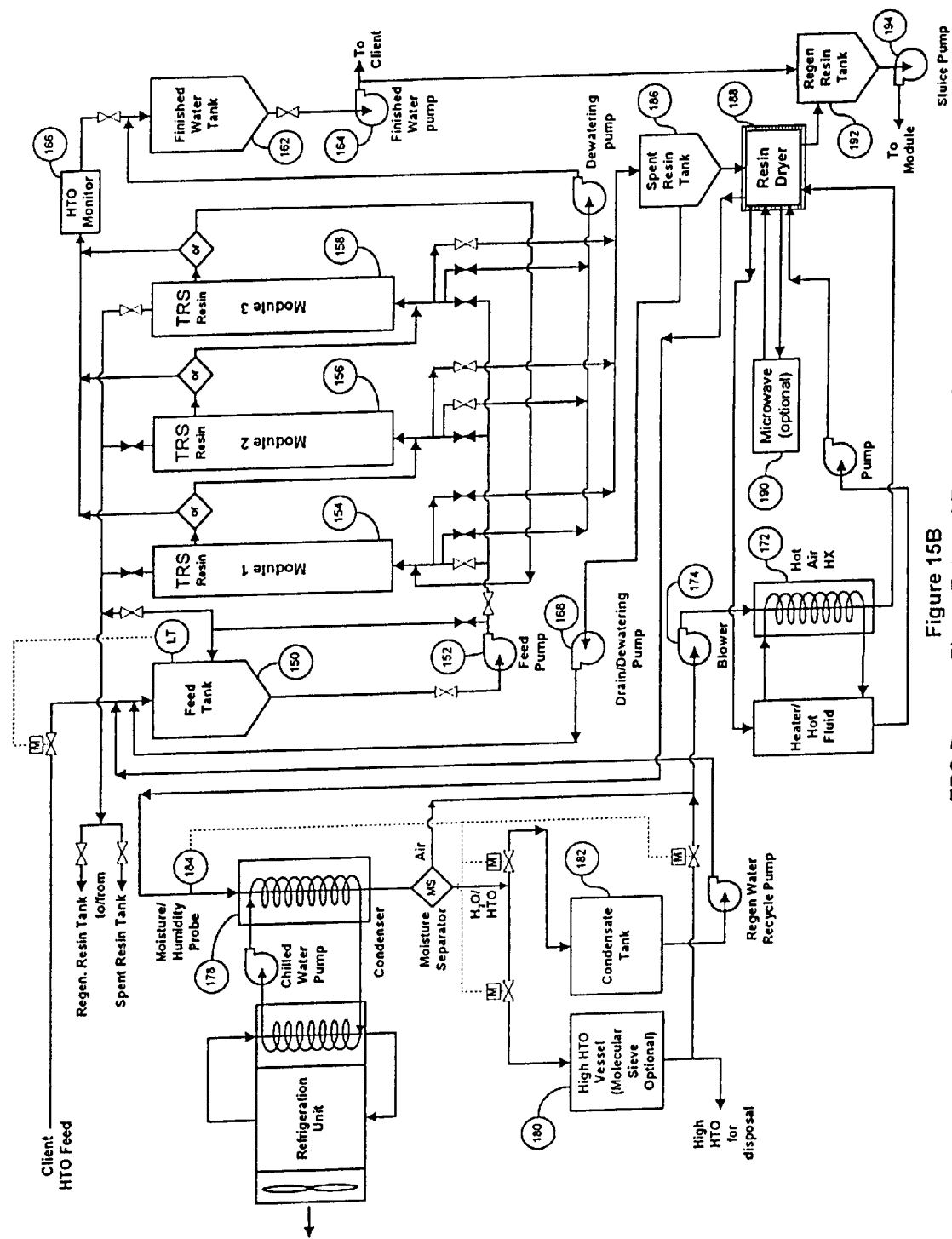

FIGS. 15A and 15B illustrate commercial systems in which the isotope molecules are separated by using three modules or chambers that contain the molecular separation material. The contaminated water is conveyed through the first module until the molecular separation material is saturated. The flow is then switched to the second module until the material in the second module is saturated, and then to the third module. Alternately, the flow may proceed through several modules in series.

As the contaminated water flow is switched from a given module, the non-bound water, i.e., the water in the module that is not held as waters of hydration is substantially removed by blowing air through the module. The separated non-bound water can then be recycled for additional separation, or removed from the system.

After removal of non-bound water, at least a portion of the waters of hydration are removed by heating the molecular separation material. The separated waters of hydration are then collected for disposal, with or without further concentration. The dehydrated resin, with or without rehydration with light water, is then used for further separation. It will also be understood that the saturated resins, before or after removal of non-bound water, can be removed from the modules for regeneration at a separate site, and then returned to the module as shown in FIG. 15B.

Referring specifically to FIG. 15A, it will be seen that contaminate water is fed to feed tank 150 from a source of contaminated water, identified as the "Client HTO Feed," and from various recycle feeds in the system. The contaminated water is then fed by feed pump 152 to one of modules 154, 156 or 158. More than three modules may also be used. Each module is filled with a resin having a plurality of hydration sites, e.g., beads of polystyrene cross-linked with divinyl benzene and loaded with a combination of sodium and aluminum sites. Various valves 160 are present in the system to control flow through the water or air lines. For this example, filled valves 160 are closed, while outlined valves 160 are open.

In operation of the system, each module has a saturation stage, a dewatering stage, and a regeneration stage. Contaminated water from feed tank 150 passes through a module, e.g., module 154, to remove a part of the isotope molecules, with the water discharged from the tank being directed to one or more finished water tanks 162, and from tanks 162 to the Client via pump 164. An HTO monitor 166 is placed in-line between the modules and finish water tanks to monitor the isotope content of the discharged water. When the isotope content reaches a level indicating the resin in the module being used has reached a saturation level, valves 160 are reset to direct flow of contaminated water to the next module in the series, e.g., module 156.

When the module is in the dewatering mode or stage, as illustrated by module 156, air is blown through the module to remove non-bound water that is carried via dewatering pump 168 back to feed tank 150. After the dewatering stage, the module is switched to the regeneration stage, as illustrated by module 158, in which the module is heated with an external heating jacket 170. Heated air from heater 172 is also blown by blower 174 through module 158 to condenser 178. The condensed molecules are separated from the air and stored in condensate tank 182.

The air is recycled to heater 172. In a second, higher temperature stage of drying, the isotope water exiting from condenser 178 is then trapped on the molecular sieve 180 or other system for storage or disposal. Moisture/humidity probe 184 monitors the quantity of water entering condenser 178, to determine if the stream is collected or recycled.

FIG. 15B illustrates a typical arrangement where the resin is regenerated external to the adsorption modules 154, 156, and 158. In this case, the resin after saturation is slurried to the spent resin tank 186 using feed water which is returned by dewatering pump 168 to the feed tank 150. The resin is then transferred to the resin dryer 188 where, as before, heated air from 172 is used to dry the resin. The dryer can be a fluidized bed, a rotating drum or other suitable device. Microwaves from 190 can also be supplied to the dryer to augment the drying process. The dry resins are then transferred to tank 192 where they may be mixed with finished water and reintroduced to an adsorption module using sluice pump 194. The dry resins can also be air transferred to the adsorption module (not shown). The majority of the systems and operations are similar with the two drying options as evident from inspection of FIGS. 15A and 15B.

Figure 15C:
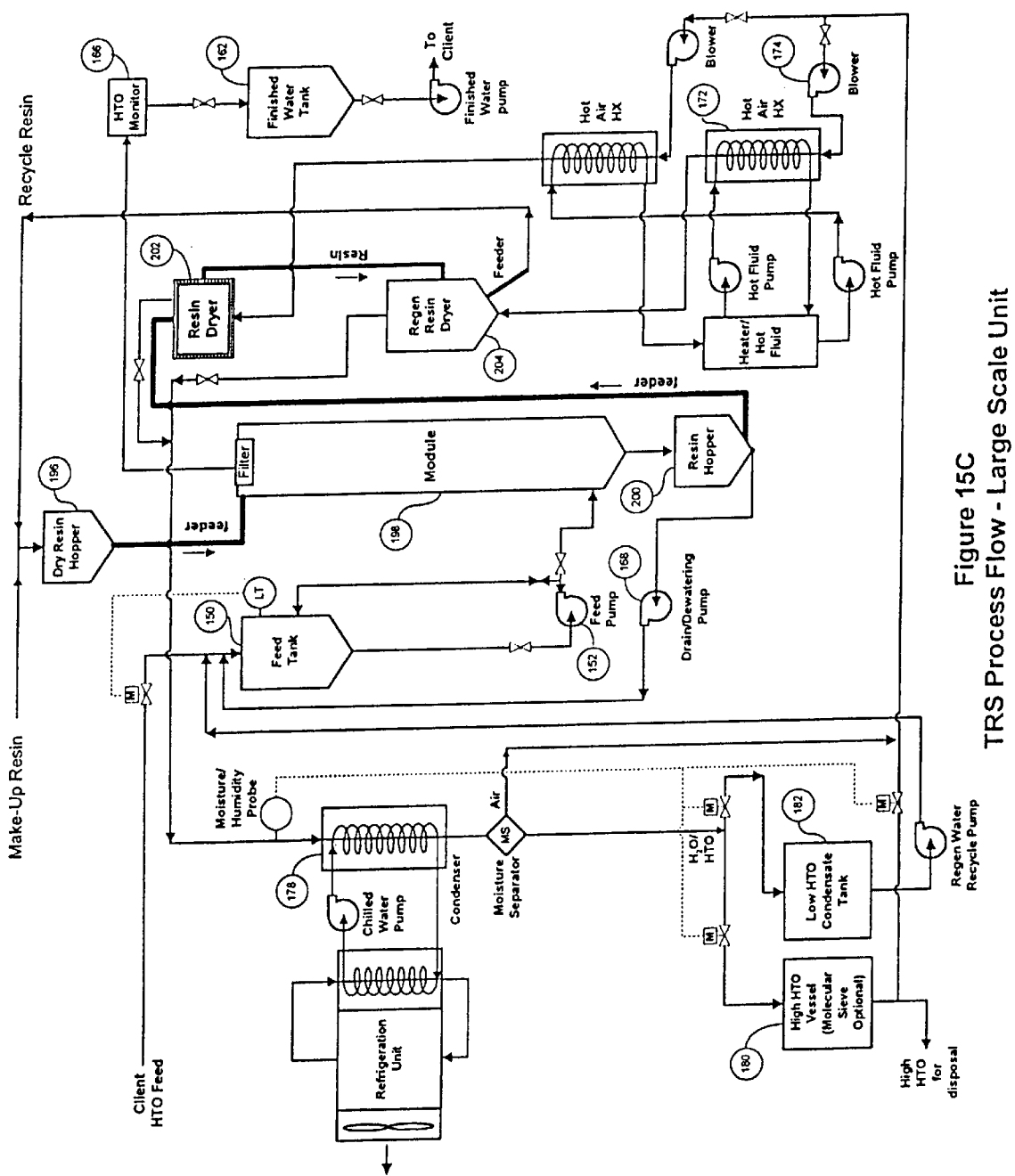
FIG. 15C is a schematic view of a counterflow commercial system suitable for larger scale, high feed rate applications.

FIG. 15C illustrates a major variation suitable for larger scale (high feed rate) applications. Supporting systems are similar to those in FIGS. 15A and 15B. The adsorption module 198, however, is a tall column where the resins descend in a countercurrent fashion in the direction of arrow R as the feed water flows up the column in the direction of arrow S. Dry resins from hopper 196 are introduced at the top of the column 198. Saturated resins are removed at the bottom to a wet resin hopper 200. The resins are continuously dewatered, transferred to resin dryer 202 and in a second drying stage to dryer 204. When dry, they are returned to the dry resin hopper 196. The feed water is fed by pump 152 up the column and the treated water flows to the finished water tank 162. The resin and water feed rates are set to achieve the desired removal of tritiated water.

FIGS. 16–24 further illustrate the experimental results achieved in the practice of the invention. Specifically, FIG. 16, is a comparison of the adsorption effectiveness of PSDVB resins loaded with aluminum, magnesium, chromium, and sodium metal sites. As will be seen from the adsorption curves, the resin with aluminum sites absorbs a greater amount of deuterium. That is, while all of the resins became saturated at about the same time after being exposed to the contaminated water, the aluminum absorbed a greater quantity of deuterium oxide from the stream as shown by the change of the exit stream from the feed stream, at points measured prior to saturation. Magnesium was the next most effective metal site, followed by sodium with chromium being the least effective.

Figure 17:
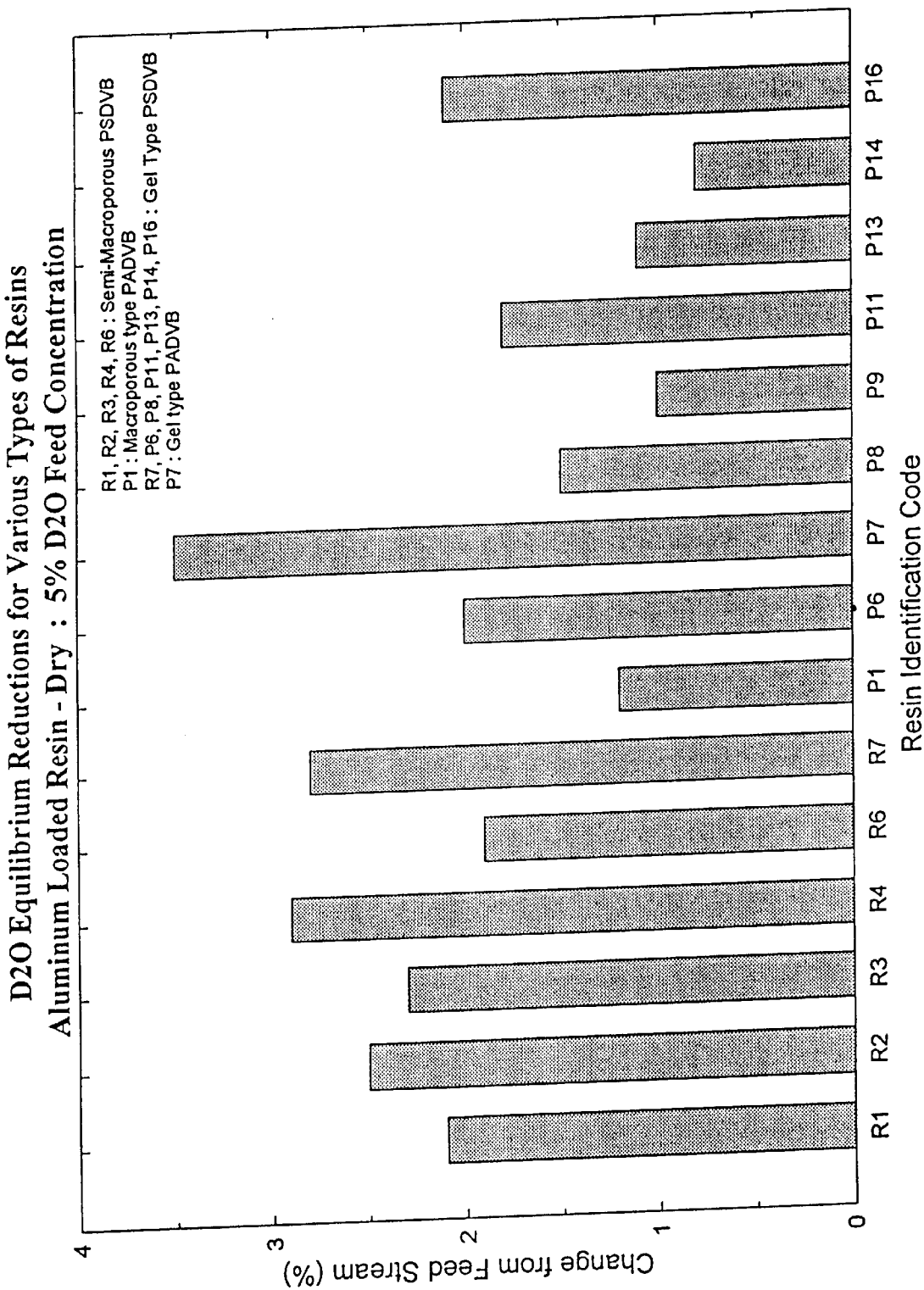
FIG. 17 is a graphical comparison of various PSDVB and PADVB resins loaded with aluminum.

FIG. 17 illustrates the test results obtained in testing various PSDVB and PADVB resins loaded with aluminum. The resins were either semi-macroporous, macroporous, or gel type resins, and were obtained from different suppliers. For example, resin R7 is PSDVB resin obtained from Biorad that was sulfonated and loaded with aluminum cations. As can be seen from FIG. 17, there was variability in effectiveness among these tested resins.

As shown in Table II, similar test results were achieved in a "beaker test" using 5 g dry Al loaded resin and 20 g contaminated water:

TABLE II

HTO Resin Adsorption Capacities
330 micro Ci/L HTO, 30° C., Glass Beakers

| Resin | % HTO Reduction |
|---|---|
| R7-PSDVB, Gel | 4.69 |
| R4-PSDVB, Gel | 2.22 |
| P7-PADVB, Gel | 1.94 |
| P9-PSDVB, Macroporous | 0.96 |
| Other carrier | |
| Zeolite, molecular sieve 4A, Na | 2.43% |
| Aluminum oxide granules | 1.60% |
| Silica gel | 2.57% |

The tests with other carriers were similarly performed with 5 g of dry carrier and 2 g of contaminated water.

Figure 18:
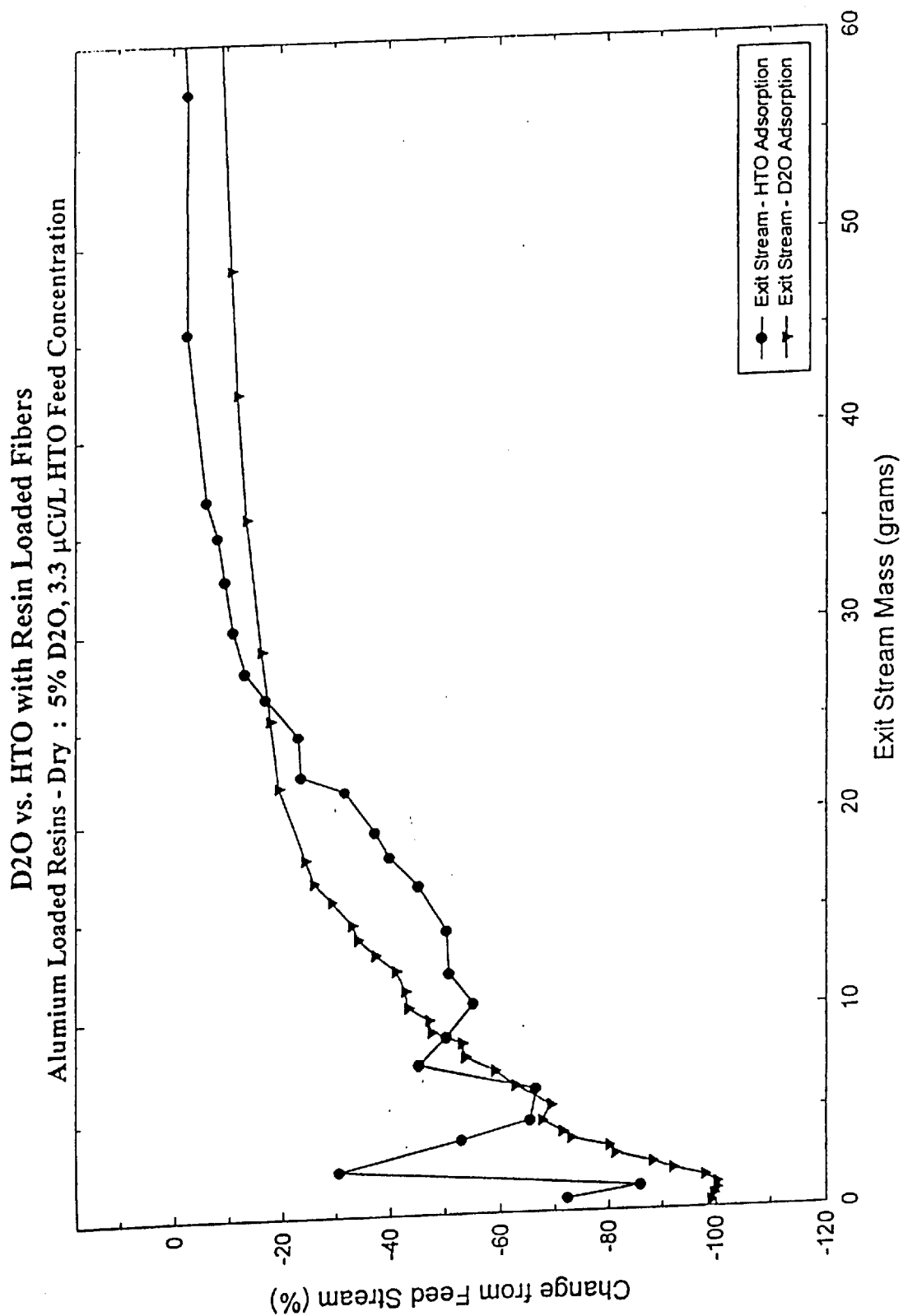
FIG. 18 is a graphical comparison of the separation of $D_2O$ and HTO showing the similarity in results.

FIG. 18 compares the separation of D2O and HTO using an Al resin packed in a bundle of 30 fibers, each about 8 feet long. As will be seen from a comparison of the two curves, the removal of the two isotopes is at approximately the same level, confirming that experimental results achieved in removal of deuterium is a valid approximation of what would be achieved under comparable conditions in separating tritium.

The strength and number of waters of hydration associations will vary with the selected cation, with the selected anions to which the cation is bonded and with the physical and chemical characteristics of the carrier. In general, the maximum number of hydration points selective to HTO or the contaminants to be removed is preferred. However, a lower threshold for selective adsorption in the range of at least 1% HTO reduction is desired when performing the above beaker test at 30° C. with 5 grams of adsorbent and 20 grams of contaminated water. This reduction is considered to be sufficient for obtaining economically substantial and useful results.

Figure 19:
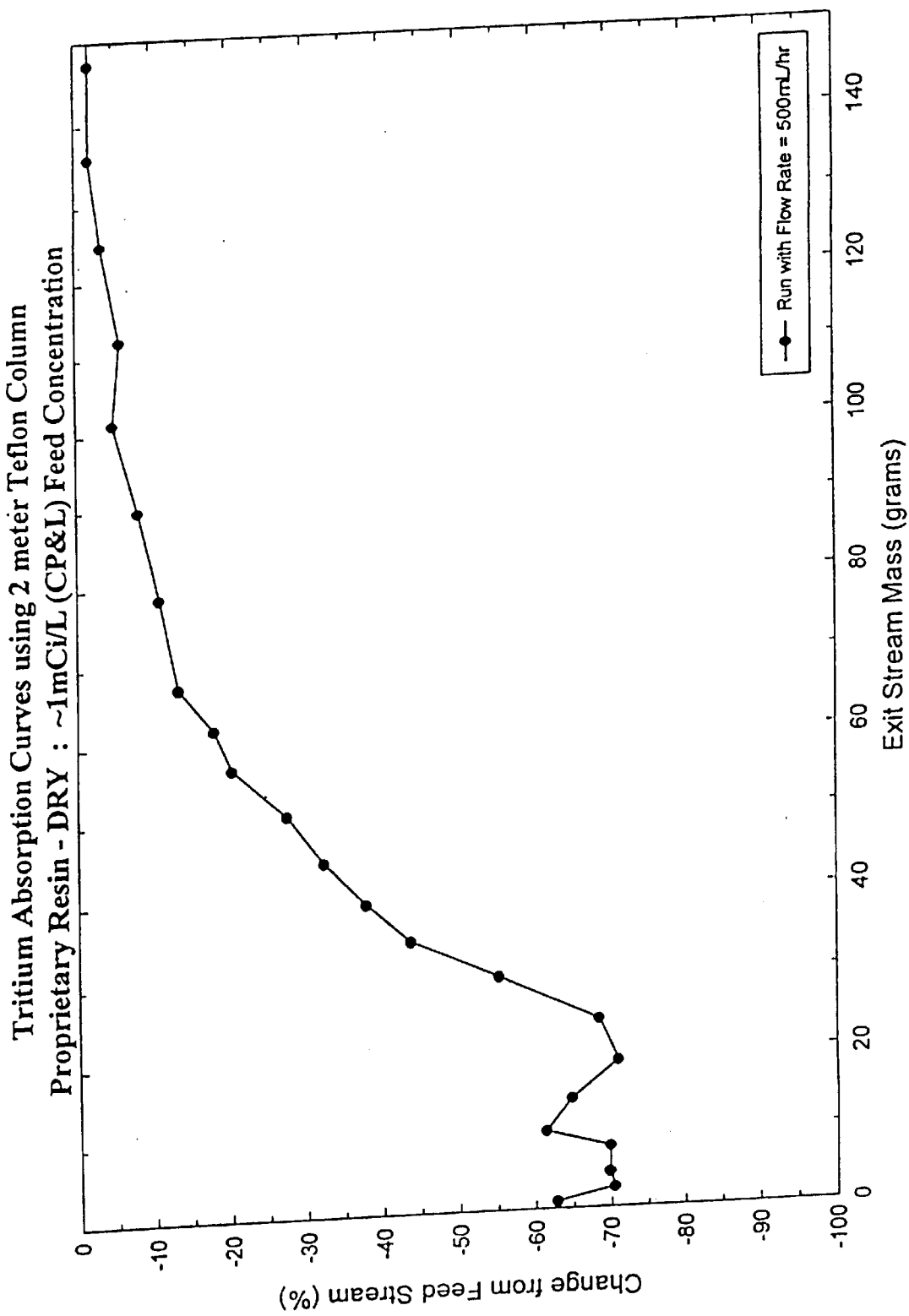
FIG. 19 is a graph of the adsorption curve observed with the use of a 2 meter TEFLON column filled with 250 g of dry Al loaded PSDVB resin.

FIG. 19 illustrates the adsorption curve observed with the use of a 2 meter Teflon column filled with 250 g of dry Al loaded PSDVB resin. As shown, the resins selectively remove a portion of the isotope molecules in the stream until the resin is saturated. Therefore, depending upon the level of separation desired, the stream can be stopped or switched to another resin bed when about 75% saturation has been reached, as indicated by a rise in the curve, after about 100% saturation has been reached, as indicated by leveling of the curve at approximately 0%, or at some point in between.

Figure 20:
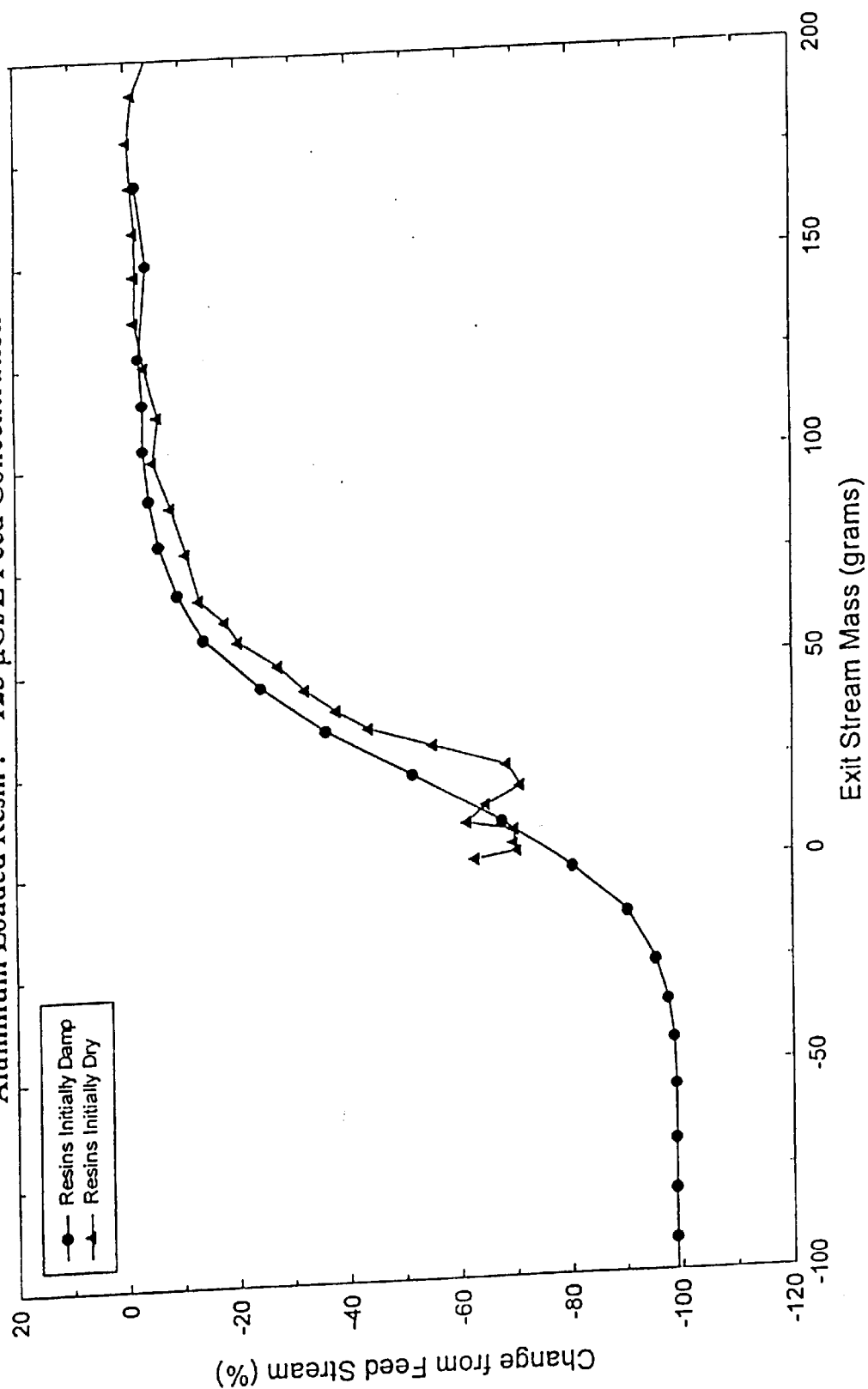
FIG. 20 is a graphical comparison of the separation properties of an initially dry resin in comparison to a pre-wet resin.

FIG. 20 illustrates the test results obtained when using an initially dry resin in comparison to a pre-wet resin. In the pre-wet case, the majority of the light water originally on the resin is displaced by the feed stream containing tritiated water. The amount of water on the resin before contacting the contaminated water feed stream was predetermined by accounting for all water used to pre-wet the resin, slurry the resin into the column, and subtracting the water collected from the blowdown step before feeding tritiated water. The zero point on the horizontal axis marks the point where the exit stream equals the initial water on the resin. In the initially dry case, there was no water on the resin and thus the entire curve starts at zero. It can be seen that the net selective tritiated water adsorption is similar for the two cases. In some commercial embodiments, it may be preferential to start with a pre-wet resin, for example where the water is used to transfer the resin from a separate regeneration vessel back to the adsorption column. In other cases, the resin may be initially dry, for example, when regenerated within the adsorption column or when transferred via an air slurry rather than a water slurry.

Figure 21:
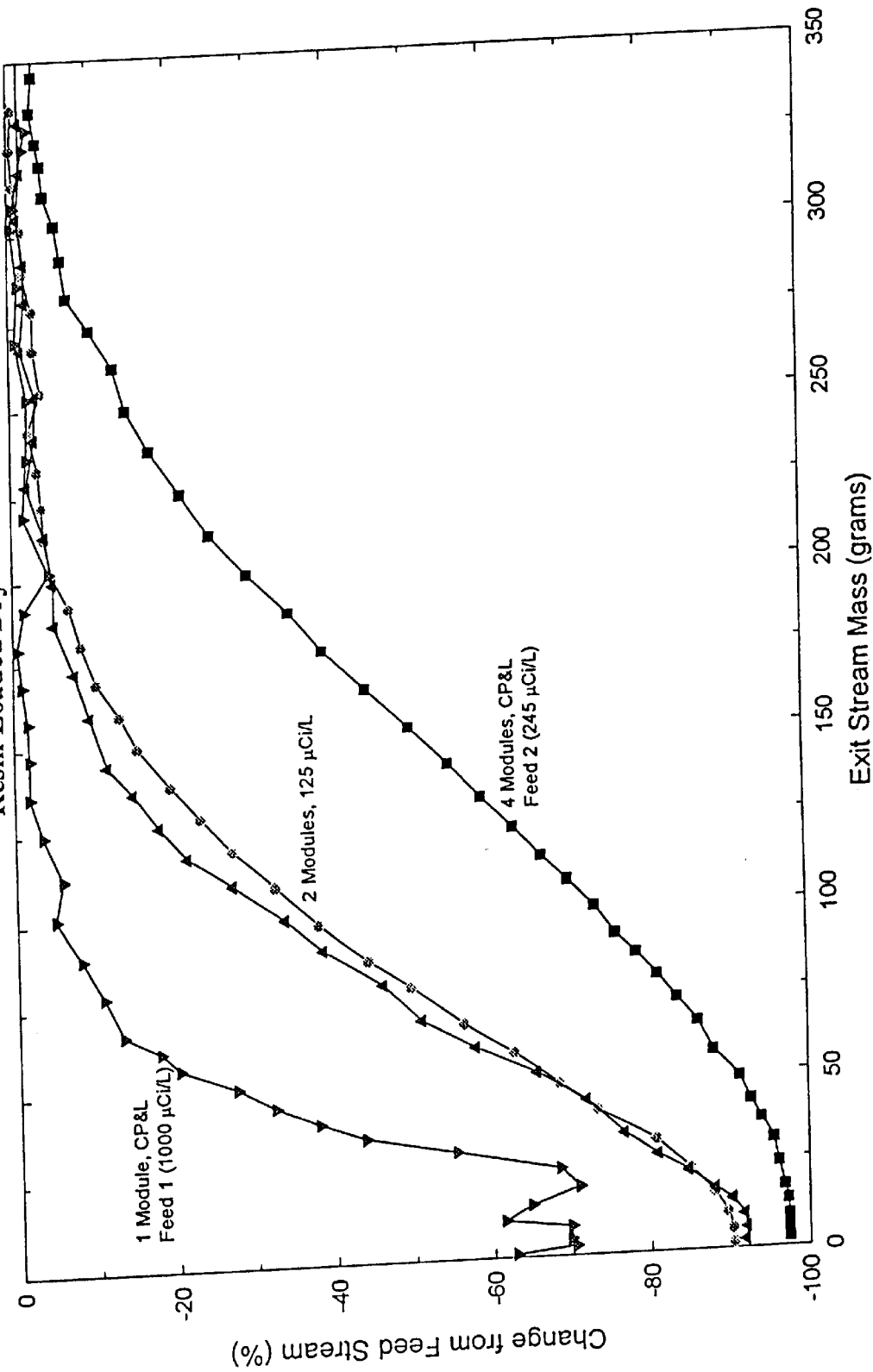
FIG. 21 is a graphical representation of isotope separations using one separation module, two separation modules, and four separation modules, when operated in series.

FIG. 21 compares separations using one separation module, two separation modules, and four separation modules, when operated in series. As seen, the two module system removes about twice the isotopes on a percent of feed basis of the one module system, and the four module system removes approximately twice the isotopes of the two module system again on a percent of feed basis. Thus, the efficiency of the overall separation is shown to be essentially linear with the amount of resin used.

Figure 22:
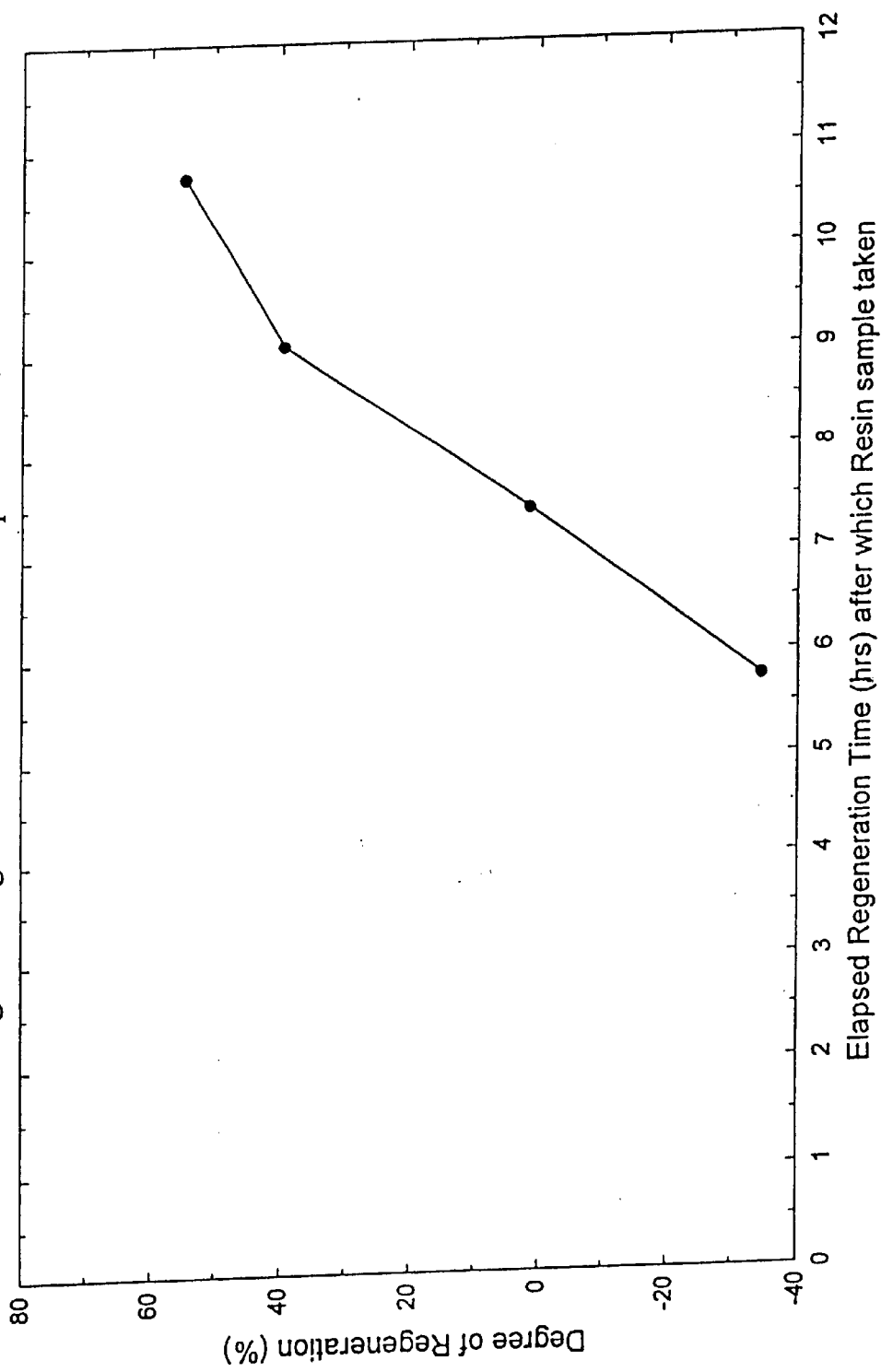
FIG. 22 is a graph of the results achieved in regenerating tritium oxide saturated acrylic resin loaded with sodium and aluminum hydration sites using a microwave oven.

FIG. 22 illustrates the results achieved in regenerating tritium oxide saturated acrylic resin loaded with sodium and aluminum hydration sites using a microwave oven.

Figure 23:
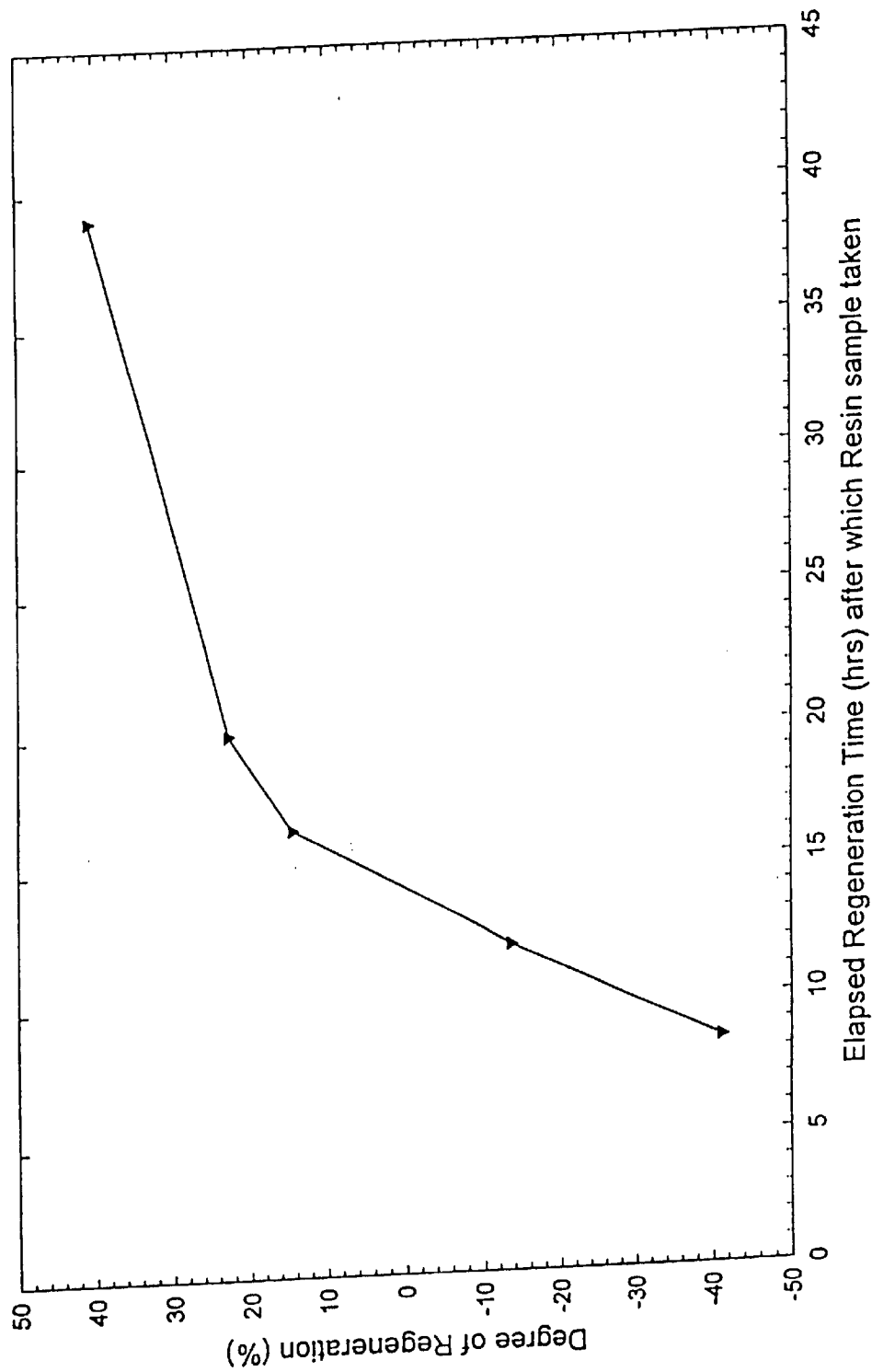
FIG. 23 is a graph of the results achieved in regenerating tritium oxide saturated PSDVB resin loaded with sodium and aluminum hydration sites using a fluidized bed dryer.

FIG. 23 illustrates the results achieved in regenerating tritium oxide saturated PSDVB resin loaded with sodium and aluminum hydration sites using a fluidized bed dryer.

FIG. 24 illustrates the results achieved in regenerating tritium oxide saturated acrylic resin loaded with sodium and aluminum hydration sites using a fluidized bed drier.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A contaminated water treating apparatus for treating water contaminated with heavy isotopes of hydrogen oxide to reduce the hydrogen isotope content of the contaminated water comprising:
   a treatment chamber containing a molecular separation material in particulate form including a support medium carrying a plurality of hydration sites capable of association with waters of hydration;
   a supply conduit in communication with said treatment chamber and a source of the contaminated water; and
   a discharge conduit in communication with said treatment chamber to carry water from said chamber, whereby contaminated water entering said chamber through said supply conduit is brought into contact with said molecular separation material, a portion of hydrogen isotope water molecules from the contaminated water attaching to a portion of said hydration sites to decrease the hydrogen isotope water molecule content of the contaminated water which is discharged through said discharge conduit.

2. The apparatus of claim 1, further including:
   a separation membrane that is selectively permeable to light water molecules relative to hydrogen isotope water molecules, said membrane being in communication with contaminated water supplied to said apparatus.

3. The apparatus of claim 1, further including:
   a regeneration chamber for removing water molecules from said molecular separation material.

4. The apparatus of claim 1, further including:
   a plurality of separation chambers attached in series, whereby water discharged from all chambers except the last chamber in sequence is directed into the next separation chamber in the series.

5. The apparatus of claim 1, wherein:
   said support medium includes a polymer with said hydration sites attached thereto.

6. The apparatus of claim 1, wherein:
   said hydration sites are capable of combining with a substantial quantity of waters of hydration.

7. The apparatus of claim 1, wherein:
   said hydration sites with associated waters of hydration are present in sufficient quantity to substantially decrease the hydrogen isotope content of contaminated water.

8. The apparatus of claim 1, wherein said chamber further includes:
   a heater for removing waters of hydration from said molecular separation material by vaporization.

9. The apparatus of claim 1, further including:
   an external heated drying tank for receiving said molecular separation material in a slurry with the contaminated water directly from said chamber for removal of waters of hydration from said molecular separation material by evaporation.

10. A contaminated water treating apparatus for treating water contaminated with heavy isotopes of hydrogen oxide to reduce the hydrogen isotope content of the contaminated water comprising:
    a separation membrane that is selectively permeable to light water molecules relative to hydrogen isotope water molecules;
    at least one treatment chamber containing a molecular separation material in particulate form including a support medium carrying a plurality of hydration sites attachable to waters of hydration;
    a supply conduit in communication with said membrane, said treatment chamber and a source of the contaminated water, the contaminated water placed into contact with said separation membrane being increased in concentration of hydrogen isotope water molecules, contaminated water placed into contact with said molecular separation material having a portion of the hydrogen isotope water molecules in the contaminated water attached to a portion of said hydration sites; and
    a discharge conduit to carry contaminated water having a decreased hydrogen isotope water molecule content from said apparatus.

11. The apparatus of claim 10, wherein:
    said separation membrane is in the form of at least one tube having first and second ends, and substantially continuous interior and exterior walls.

12. The apparatus of claim 11, further including:
    a membrane chamber housing said separation membrane.

13. The apparatus of claim 10, further including:

a heated chamber for removing waters of hydration from said molecular separation material by evaporation, and a collector for water evaporated from said molecular separation material.

14. The apparatus of claim 10, wherein:

said support medium includes a polymer with said hydration sites attached thereto.

15. The apparatus of claim 10, wherein:

said hydration sites capable of combining with a substantial quantity of waters of hydration whereby the hydrogen isotope content of the contaminated water is substantially reduced.

16. A contaminated water treating apparatus for treating water contaminated with heavy isotopes of hydrogen oxide to reduce the hydrogen isotope content of the contaminated water comprising:

at least two treatment chambers, each of said chambers containing a molecular separation material in particulate form that includes a support medium carrying a plurality of hydration sites capable of association by adsorption with waters of hydration;

supply conduits connecting said treatment chambers to a source of contaminated water;

control means for selectively directing contaminated water to either or both of said chambers, said control means including a monitoring means for calculating the saturation level of molecular separation material in each said chamber by comparing the hydrogen isotope contents of contaminated water entering each said chamber with that of contaminated water discharged from each corresponding said chamber;

switching means for stopping the contaminated water from flowing into each corresponding said chamber when a predetermined value of hydrogen isotope content in the contaminated water leaving the corresponding said chamber is calculated by said monitoring means.

17. The apparatus of claim 16, wherein each of said chambers further includes:

water removal means for removing non-hydrated water from one said chamber after the supply of contaminated water is stopped and directed from one said chamber to the other said chamber.

18. The apparatus of claim 16, wherein each of said chambers further includes:

a heater for heating saturated molecular separation material in each said chamber to remove waters of hydration therefrom.

19. A contaminated water treating apparatus for treating water contaminated with heavy isotopes of hydrogen oxide to reduce the hydrogen isotope content of the contaminated water comprising:

a treatment chamber;

a first supply conduit in communication with an upper portion of said treatment chamber and a supply of a molecular separation material including a support medium carrying a plurality of hydration sites capable of association with waters of hydration;

a second supply conduit in communication with a lower portion of said treatment chamber and a source of the contaminated water;

a first discharge conduit in communication with an upper end of said treatment chamber to carry ascending contaminated water from said treatment chamber, whereby contaminated water entering said chamber through said second supply conduit is brought into counterflow contact with said molecular separation material descending within said treatment chamber, a portion of the hydrogen isotope water molecules from the contaminated water combining with a portion of said hydration sites, thus decreasing hydrogen isotope water molecule content of the contaminated water removed from said treatment chamber through said first discharge conduit;

a second discharge conduit in communication with a lower end of said treatment chamber to carry descending molecular separation material from said treatment chamber.

* * * * *